(12) United States Patent
Alvarez et al.

(10) Patent No.: US 11,798,191 B2
(45) Date of Patent: Oct. 24, 2023

(54) SENSOR CALIBRATION AND SENSOR CALIBRATION DETECTION

(71) Applicant: Intel Corporation, Santa Clara, CA (US)

(72) Inventors: Ignacio Alvarez, Portland, OR (US); Cornelius Buerkle, Karlsruhe (DE); Maik Sven Fox, Rheinstetten (DE); Florian Geissler, Munich (DE); Ralf Graefe, Haar (DE); Yiwen Guo, Beijing (CN); Yuqing Hou, Beijing (CN); Fabian Oboril, Karlsruhe (DE); Daniel Pohl, Puchheim (DE); Alexander Carl Unnervik, Munich (DE); Xiangbin Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 16/832,094

(22) Filed: Mar. 27, 2020

(65) Prior Publication Data

US 2020/0226790 A1    Jul. 16, 2020

(51) Int. Cl.
*G06T 7/80* (2017.01)
*G01S 13/931* (2020.01)
(Continued)

(52) U.S. Cl.
CPC ............... *G06T 7/80* (2017.01); *G01S 7/40* (2013.01); *G01S 7/4972* (2013.01);
(Continued)

(58) Field of Classification Search
CPC ........ G01S 13/865; G01S 7/4972; G01S 7/40; G01S 17/931; G06T 7/80
(Continued)

(56) References Cited

U.S. PATENT DOCUMENTS

2017/0202450 A1 * 7/2017 Carrafa ................. A61B 3/032
2017/0221226 A1    8/2017 Shen et al.
(Continued)

OTHER PUBLICATIONS

European Search Report issued for the corresponding European patent application No. 20 20 7750, dated Jun. 9, 2021, 8 pages (for informational purposes only).
(Continued)

*Primary Examiner* — On S Mung
(74) *Attorney, Agent, or Firm* — VIERING,JENTSCHURA&PARTNER MBB

(57) ABSTRACT

A sensor calibrator comprising one or more processors configured to receive sensor data representing a calibration pattern detected by a sensor during a period of relative motion between the sensor and the calibration pattern in which the sensor or the calibration pattern move along a linear path of travel; determine a calibration adjustment from the plurality of images; and send a calibration instruction for calibration of the sensor according to the determined calibration adjustment. Alternatively, a sensor calibration detection device, comprising one or more processors, configured to receive first sensor data detected during movement of a first sensor along a route of travel; determine a difference between the first sensor data and stored second sensor data; and if the difference is outside of a predetermined range, switch from a first operational mode to a second operational mode.

24 Claims, 13 Drawing Sheets

(51) Int. Cl.
*G01S 13/86* (2006.01)
*G01S 7/40* (2006.01)
*G01S 7/497* (2006.01)
*G01S 17/931* (2020.01)

(52) U.S. Cl.
CPC .......... *G01S 13/865* (2013.01); *G01S 13/867* (2013.01); *G01S 13/931* (2013.01); *G01S 17/931* (2020.01); *G06T 2207/30236* (2013.01); *G06T 2207/30248* (2013.01); *G06T 2207/30252* (2013.01); *G06T 2207/30261* (2013.01)

(58) Field of Classification Search
USPC .......................................................... 356/72
See application file for complete search history.

(56) References Cited

U.S. PATENT DOCUMENTS

2020/0007843 A1   1/2020   Zhang
2021/0199479 A1*  7/2021   Lau ..................... G01D 18/008

OTHER PUBLICATIONS

Schoepflin et al., Dynamic Camera Calibration of Roadside Traffic Management Cameras for Vehicle Speed Estimation, IEEE Transactions on Intelligent Transportation Systems, Jun. 2003, 9 pages, vol. 4, No. 2, IEEE.

Schoeller et al., Targetless Rotational Auto-Calibration of Radar and Camera for Intelligent Transportation Systems, 2019 IEEE Intelligent Transportation Systems Conference—ITSC, Oct. 2019, 8 pages, IEEE.

Quan, Sensor Calibration and Measurement Model, Introduction to Multicopter Design and Control, 10.1007/978-981-10-3382-7_7, 2017, 27 pages, 2017, Springer Nature Singapore Pte Ltd.

Persic et. al., Extrinsic 6DoF Calibration of 3D LiDAR and Radar, 2017 European Conference on Mobile Robots (ECMR), 10.1109/ECMR.2017.8098688, Electronic ISBN: 978-1-5386-1096-1, Print on Demand(PoD) ISBN: 978-1-5386-1097-8, Sep. 6-8, 2017, 6 pages, IEEE.

Knorr, Self-Calibration of Multi-Camera Systems for Vehicle Surround Sensing, Institut fuer Mess-und Regelungstechnik, Apr. 25, 2017,166 pages, vol. 041, ISBN 978-3-7315-0765-9, Karlsruher Institut für Technologie (KIT) KIT Scientific Publishing, Karlsruhe, Germany.

Klinker, Augmented Reality II—Camera Calibration—, May 11, 2004, 46 pages.

Catalá-Prat et al., Self-Calibration System for the Orientation of a Vehicle Camera, ISPRS Commision V Symposium "Image Engineering and Vision Metrology", Sep. 2006, 6 pages, vol. XXXVI Part 5, The International Society for Photogrammetry and Remote Sensing.

Bouguet, Camera Calibration Toolbox for Matlab, Oct. 14, 2015, 5 pages, California Institute of Technology.

* cited by examiner

SENSOR CALIBRATION AND SENSOR CALIBRATION DETECTION

TECHNICAL FIELD

Various aspects of this disclosure generally relate to sensor calibration for autonomous driving systems and/or the detection of sensor calibration.

BACKGROUND

Autonomous vehicles and semi-autonomous vehicles utilize a variety of sensors. Many of these sensors may require occasional calibration. Inadequate calibration may decrease safety of vehicle operation. Many sensors are often manually calibrated, which may require that the vehicle be taken to a repair center and may require that the vehicle remain out of service for a lengthy period of time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1:
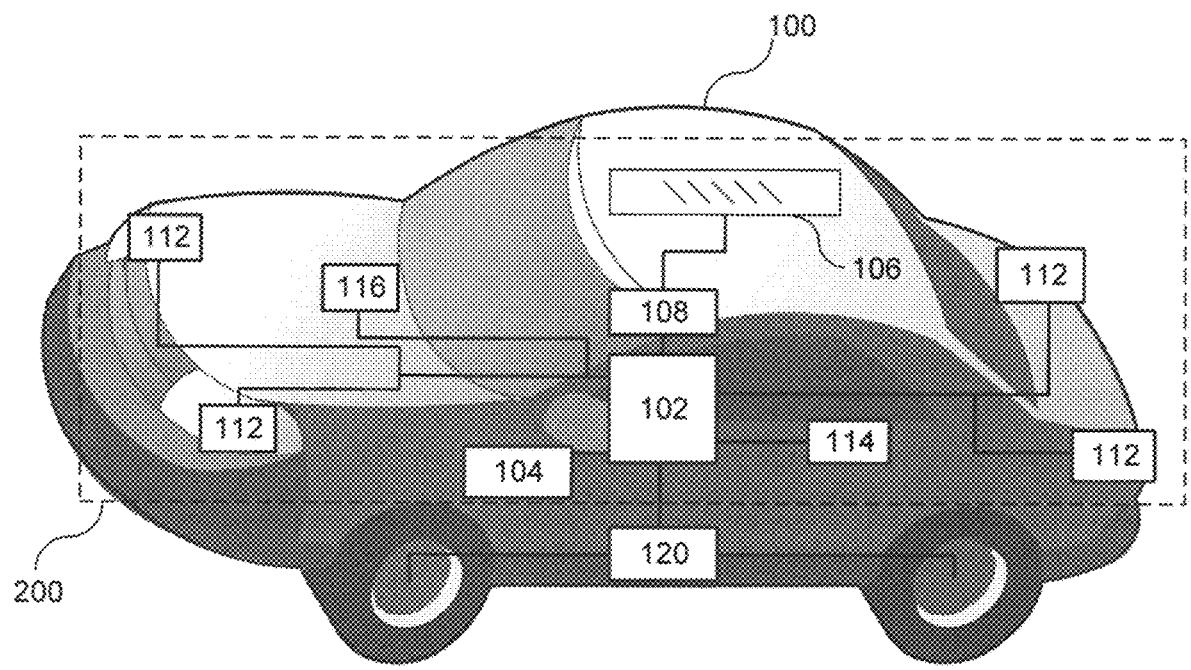
FIG. 1 shows an exemplary autonomous vehicle in accordance with various aspects of the present disclosure.

The following detailed description refers to the accompanying drawings that show, by way of illustration, exemplary details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer. In further examples, a vehicle can include: a motorcycle, a bicycle, a tricycle, a train locomotive, a train wagon, a moving robot, a personal transporter, a boat, a ship, a submersible, a submarine, and the like.

A "ground vehicle" may be understood to include any type of vehicle, as described above, which is configured to traverse or be driven on the ground, e.g., on a street, on a road, on a track, on one or more rails, off-road, etc. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A computing system may execute a machine learning model to progressively improve performance of a specific task. In some aspects, the computing system may adjust parameters of a machine learning model during a training phase based on training data. The computing system may use the trained machine learning model during an inference phase to make predictions or decisions based on input data. In some aspects, the computing system may use the trained machine learning model to generate additional training data. The computing system can adjust an additional machine learning model during a second training phase based on the generated additional training data. The computing system may use a trained additional machine learning model during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

Throughout this disclosure, the word "sensor" is used in connection with the detection of data related to a vicinity of the sensor. A "sensor" may be any type of sensor, without limitation, and may include an "image sensor".

An "image sensor" is used in connection with a sensor that detects image data related to a vicinity of the sensor. An image sensor is intended to include at least a still camera, a video camera, an infrared camera, LIDAR, Radar, or any combination thereof. This definition is not intended to be limiting or exclusive, and it is expected that the principles, methods, and devices disclosed herein may be performed or operated with alternative sensors not otherwise described herein.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, a computing system may build the model from a training set of data including only inputs and no desired outputs. The computing system may use the unsupervised model to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, it is possible to restrict the outputs to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

FIG. 1 shows a vehicle 100 including a mobility system 120 and a control system 200 (see also FIG. 2) in accordance with various aspects. It is appreciated that vehicle 100 and control system 200 are exemplary in nature and may thus be simplified for explanatory purposes. The quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, boat hull, or similar type of vehicular body dependent on the type of vehicle that vehicle 100 is.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
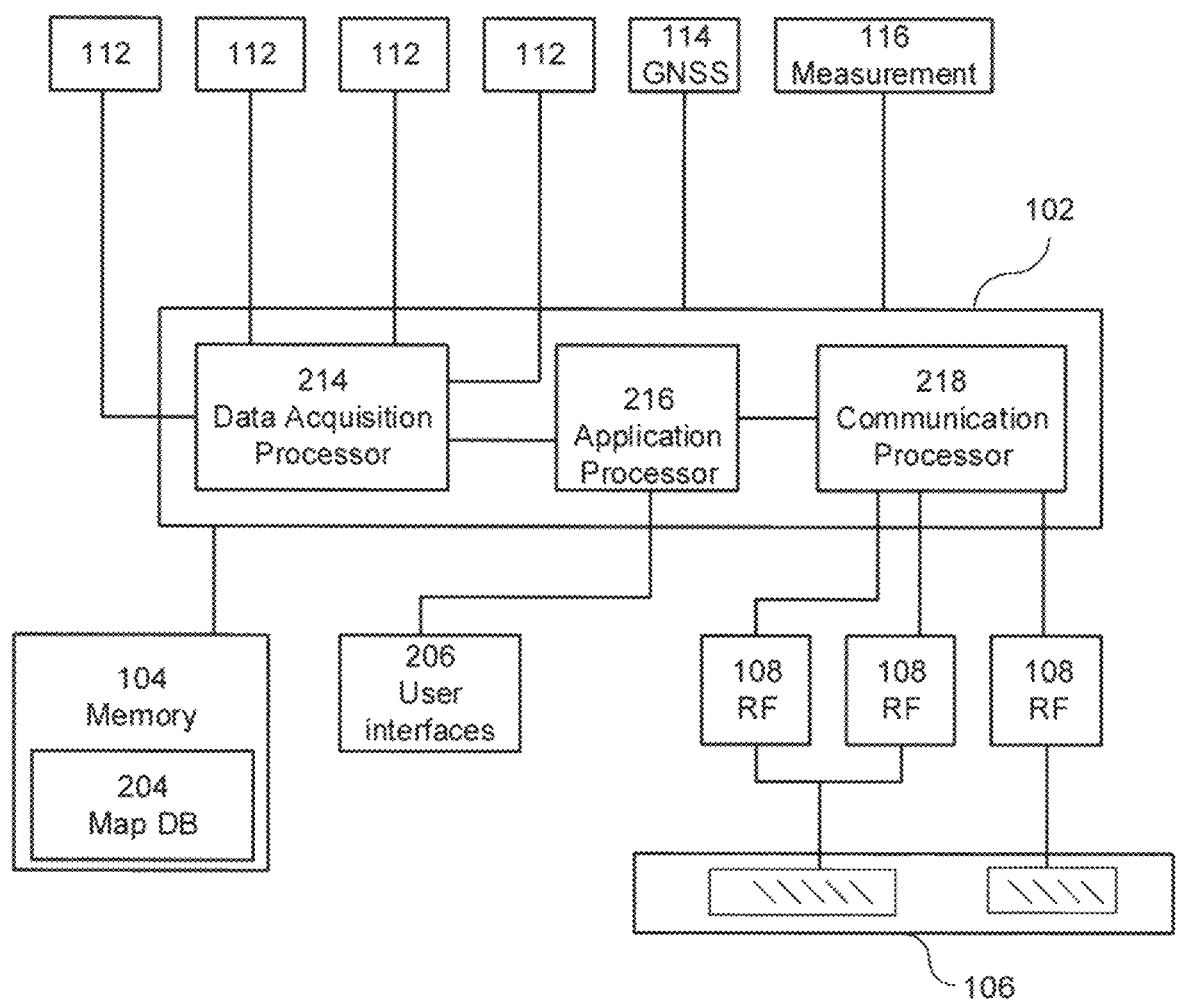
FIG. 2 shows various exemplary electronic components of a safety system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 216 may include processing circuitry, such as a CPU, for processing data acquired by data acquisition units 112. For example, if one or more data acquisition units are image acquisition units, e.g. one or more cameras, then the data acquisition processor may include image processors for processing image data using the information obtained from the image acquisition units as an input. The data acquisition processor 216 may therefore be configured to create voxel maps detailing the surrounding of the vehicle 100 based on the data input from the data acquisition units 112, i.e., cameras in this example.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via one or more user interfaces 206. User interfaces 206 may include one or more screens, microphones, mice, touchpads, keyboards, or any other interface providing a mechanism for user input.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Vehicle 100 may transmit and receive wireless signals with antenna system 106, which may be a single antenna or an antenna array that includes multiple antenna elements. In some aspects, antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying the transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3). The controller may thus be responsible for controlling the radio communication components of vehicle 100 (antenna system 106, RF transceiver(s) 108, position device 114, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard such as e.g. Bluetooth, Zigbee, and the like, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP ($3^{rd}$ Generation Partnership Project) standards. As a further example, communication processor 218 may be configured to operate via a third RF transceiver of the one or more RF transceivers(s) 108 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. truck vs. boat.

Position devices 114 may include components for determining a position of the vehicle 100. For example, this may include global position system (GPS) or other global navigation satellite system (GNSS) circuitry configured to receive signals from a satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, road infrastructure, road features, road markings, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

Figure 3:
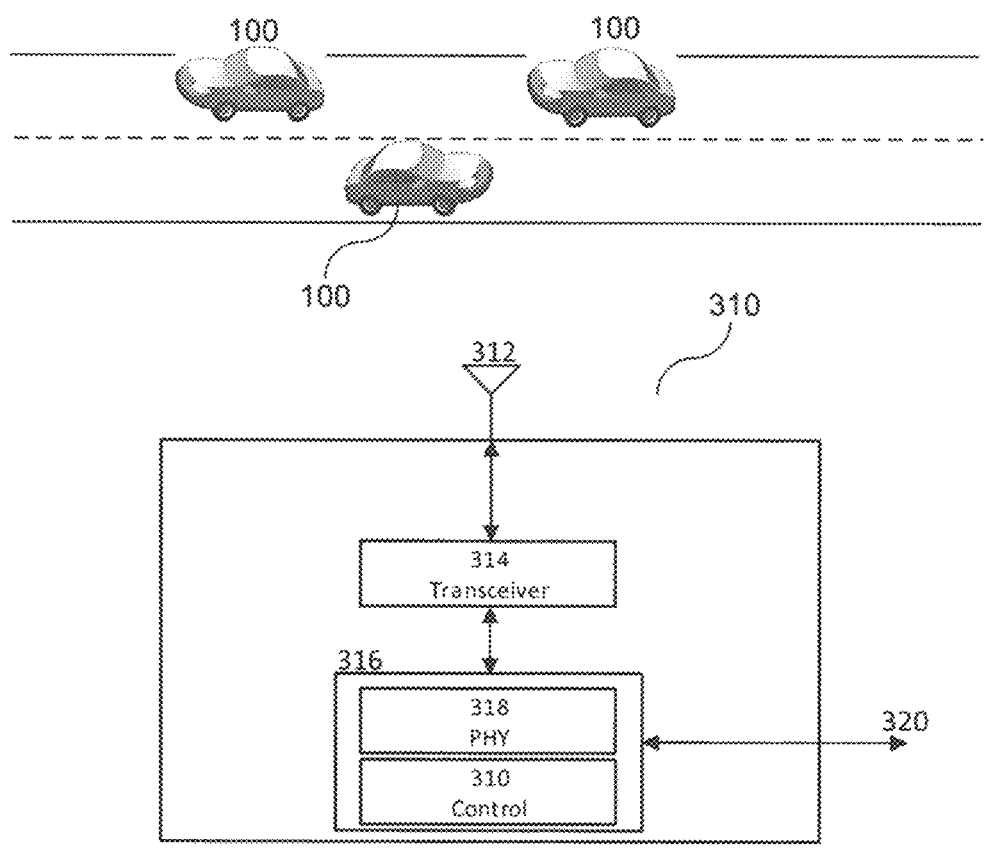
FIG. 3 shows an exemplary network area with various communication devices according to some aspects.

FIG. 3 shows an exemplary network area 300 according to some aspects. Network area 300 may include a plurality of vehicles 100, which may include, for example, ground vehicles. Any one of these vehicles may communicate with one or more other vehicles 100 and/or with network infrastructure element (NIE) 310. NIE 310 may be a base station (e.g. an eNodeB, a gNodeB, etc.), a road side unit (RSU), a road sign configured to wirelessly communicate with vehicles and/or a mobile radio communication network, etc., and serve as an interface between one or more of vehicles 100 and a mobile radio communications network, e.g., an LTE network or a 5G network.

NIE 310 may include, among other components, at least one of an antenna system 312, a RF transceiver 314, and a baseband circuit 316 with appropriate interfaces between each of them. In an abridged overview of the operation of NIE 310, NIE 310 may transmit and receive wireless signals via antenna system 312, which may be an antenna array including multiple antenna arrays. Antenna system 312 may include multiple antenna elements (e.g., multiple antenna arrays) in order to employ multiple-input and multiple-output (MIMO) methods and schemes.

RF transceiver 314 may perform transmit and receive RF processing to convert outgoing baseband samples from baseband circuit 316 into analog radio signals to provide to antenna system 312 for radio transmission and to convert incoming analog radio signals received from antenna system 312 into baseband samples to provide to baseband circuit 316. Accordingly, RF transceiver 314 may be configured to operate similarly to the RF transceiver(s) described in FIGS. 1 and 2, albeit perhaps on a much larger scale (e.g., amplifiers to transmit higher power signals, etc.).

Baseband circuit 316 may include a controller 310 and a physical layer processor 318 which may be configured to perform transmit and receive PHY processing on baseband samples received from RF transceiver 314 to provide to a controller 310 and on baseband samples received from controller 310 to provide to RF transceiver 314. In some aspects, the baseband modem 316 may be located external to the NIE 310, e.g., at a centralized location of a mobile radio communication network. Controller 310 may control the communication functionality of NIE 310 according to the corresponding radio communication technology protocols, which may include exercising control over antenna system 312, RF transceiver 314, and physical layer processor 318. Each of RF transceiver 314, physical layer processor 318, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. NIE 310 may also include an interface 320 for communicating with (e.g. receiving instructions from, providing data to, etc.) with a core network according to some aspects.

Additionally, NIE 310 may include a memory 330, which may be internal to NIE 310 (as shown in FIG. 3) or external to NIE 310 (not shown). Memory 330 may store one or more maps of the coverage area of NIE 310 among other types of information. Each of the one or more maps may include a static layer depicting environmental elements that remain largely unchanged over longer periods of time (e.g., roads, structures, trees, etc.) and/or a dynamic layer with more frequent changes (e.g., vehicles, detected obstacles, construction, etc.). In some aspects, memory 330 may also store maps corresponding to one or more neighboring areas of NIE 310 so as to provide vehicles within its coverage area with information of neighboring coverage areas (e.g., to facilitate the process when a vehicle moves to the coverage of the neighboring NIE).

Aspects of the current disclosure include methods to dynamically recalibrate intelligent sensors in automated transportation systems (e.g., autonomous vehicles, partially autonomous vehicles, or semi-autonomous vehicles) with the help of one or more calibration elements. These methods may be utilized to recalibrate onboard vehicle sensors that pass by a static calibration element placed in the infrastructure (herein referred to as mode A), or alternatively to recalibrate fixed infrastructure sensors that recalibrate by observing a moving calibration element that is mounted on a test vehicle (referred to as mode B). As will be described here, additional information may be required for the calibration process, and said additional information may often be included in a symbol within the calibration element. The symbol may have any form or forms, without limitation, that carry information for use in a calibration process. The symbol may be part of, or distinct from, the calibration element. The symbol may include an optical symbol (e.g., a barcode, a QR-code, or other sensor-obtainable label). One or more processors may be configured to identify, extract, and/or decode the symbol.

Automated vehicles rely on the input of various onboard sensing systems for the perception of the environment. Miscalibration (i.e., inadequate or deficient calibration) of such sensors, may result from structural changes in the automated vehicles. Such structural changes may result, for example, from impact. Additionally or alternatively, software defects may affect the integrity of the sensor data. Such calibration deficits may become safety-critical, thereby resulting in reduced vehicle safety. These may require correction, preferably as soon as possible or with minimum delay. Such calibration services may be costly and time-intensive, and they may require the vehicle to be temporarily unavailable or unusable while the vehicle's sensor(s) are calibrated in a garage.

Similarly, sensor calibration may play an integral role in smart roadside infrastructures. Distributed sensing at the roadside may offer the ability to acquire real-time data for traffic surveillance, for the augmentation of sensing data of intelligent vehicles, for road condition monitoring, etc. Extrinsic miscalibration may occur, for instance, due to external factors such as wind or collisions, often in areas that are difficult to access, and thus may represent a notorious problem for infrastructure operators. Such miscalibration may also be the result of an attempt to compromise the system.

Herein is disclosed a method and a device/system for dynamic self-calibration. This self-calibration procedure may operate according to at least two aspects of the disclosure. According to a first aspect, the procedure can calibrate onboard vehicle sensors (mode A). According to a second aspect, the procedure can calibrate static infrastructure sensors (mode B). In mode A, the procedure, with the help of a passive and static infrastructure element, may calibrate an onboard sensor that moves along with its host vehicle. In mode B, a static infrastructure sensor may self-calibrate by observing a dynamic but passive target vehicle (e.g., a moving target vehicle with a passive calibration element), which may include a particular calibration element. In both situations, and due to the dynamics of the system, sensors may detect the calibration element (e.g. a chessboard structure with equidistant squares, for cameras) multiple times at different angles and distances. This may allow for a multi-plane calibration of both the intrinsic and extrinsic camera parameters. In addition, the calibration element (in the infrastructure for mode A, or attached to the test vehicle in mode B) may feature a symbol (e.g., a barcode), which may be machine-readable, such as, for example, by a camera. This symbol may contain information required for complete calibration, in particular the true size of the attached calibration pattern, a signature that makes the element identifiable as a calibration element, and the relative pose that this element has to the road (mode A) or the vehicle (mode B).

Compared to other calibration methods, the methods and principles disclosed herein permit rapid (i.e., due to the fact that relatively little additional information, such as a vehicle trajectory, is required) dynamic calibration of extrinsic and intrinsic (in case of camera use) sensor parameters. Such rapid calibration may contribute to road safety via improved sensor integrity. Moreover, the methods and principles disclosed herein may be applied to the self-calibration of both intelligent vehicle sensors and sensors mounted in roadside infrastructures. These principles and methods may be modified to account for a variety of sensor types, such as, but not limited to, cameras, Radar, and Lidar.

The methods and principles described herein may rely on a known trajectory/heading of a vehicle for the sensor calibration. Whether operating in mode A or mode B, it is assumed that image data will be obtained over a span of time and/or at a plurality of discrete points in time, while a vehicle is traveling. It may be assumed that the vehicle is traveling on a roadway, and that said roadway is straight, or essentially straight, or at least that the path of the roadway is known. It is generally assumed that the path of travel of the vehicle will generally correspond to a path of the roadway on which it is traveling. That is, if the roadway is straight, then the vehicle's path of travel will also be generally straight. Small deviations between the path of the roadway and the path of the vehicle may be expected (e.g., due to imperfections in the roadway, steering correction, steering tolerance, or otherwise); however, over multiple measurements, these can largely be accounted for, or a least the magnitude of impact of said deviations may be reduced.

Sensors and their functional integrity are of paramount importance for the environmental perception of automated vehicles and smart infrastructures. The methods and principles disclosed herein may allow for simplification and acceleration of the process of calibrating both the intrinsic (for camera) and extrinsic parameters of these sensors, and therefore may contribute to road safety. The calibration process may be dynamic so as not to not interrupt the traffic flow, and/or not to require any vehicle downtime or human labor. Calibration structures may be cost-efficiently integrated in existing infrastructure elements such as gantries (road sign holders) or road signs.

One or more calibration elements may be utilized to calibrate the one or more sensors. The term "calibration element" may be any structure or infrastructure outside of the vehicle that includes a calibration pattern. According to mode A, the calibration element may be a passive structure. The one or more calibration elements may include one or more calibration patterns. Said calibration patterns may be readily detected at the roadside (mode A) or from test vehicles (mode B).

According to one aspect, the one or more calibration patterns may have one or more specific and/or easily recognizable shapes. The one or more calibration patterns may include one or more codes, which may be located, isolated, decoded, and/or interpreted by one or more processors. The one or more calibration patterns and/or one or more codes may optionally resemble a desired shape, such as, for instance, a corporate logo etc., in which case they further contribute to branding. The specific shape may depend on the desired implementation, and more than one shape may be used.

Figure 4:
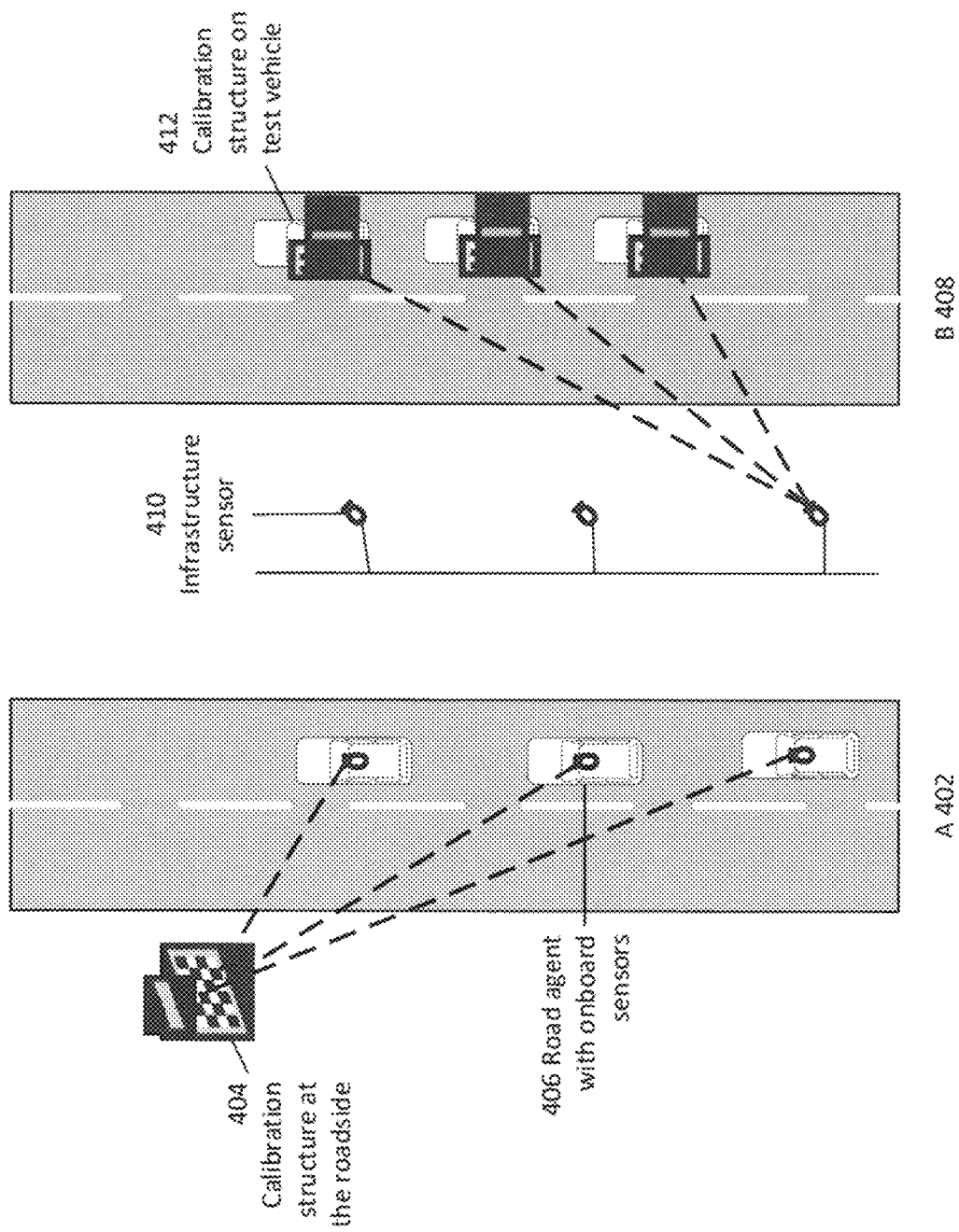
FIG. 4 depicts sensor calibration according to mode A and mode B.

The calibration structure may be placed statically (mode A), such as when placed as a roadside infrastructure element, or mounted on a test vehicle (mode B). FIG. 4 depicts sensor calibration according to mode A 402 and mode B 408. According to mode A 402, one or more calibration structures 404 including one or more calibration patterns (see, i.e., checker pattern) may be placed along a roadway. A vehicle 404 driving along the roadway may obtain sensor data of the one or more calibration structures 404 and may analyze the obtained sensor data to do any of: determine whether one or more sensors are sufficiently calibrated, determine a calibration adjustment for one or more sensors, send a calibration instruction for calibration of the one or more sensors, or any combination thereof.

According to an aspect of the disclosure, the one or more calibration structures may include a fixed and/or printed street sign. According to another aspect, the one or more calibration structures may include one or more displays, which are configured to display a calibration pattern and/or a calibration code.

According to another aspect, the one or more calibration structures may be depicted using displays emitting infrared light. In so doing, the pattern would be invisible to human eyes but visible to other devices, such as to infrared cameras. This may preclude the pattern and/or code from being a distraction to a driver or passenger in the vehicle.

Depending on the configuration, the calibration pattern being shown on a display (infrared or otherwise) may be configured to change over time such that multiple encounters between a sensor calibration device and the calibration pattern (whether according to mode A or mode B) may allow the sensor calibration device to evaluate the current calibration and/or send an instruction for calibration based on a plurality of different calibration patterns. This may be beneficial, for example, when, for example in the event that a long-range camera is to be calibrated, it might be better if a larger calibration pattern width is used. As will be described herein, including a variable display to display the calibration pattern and/or calibration code may also allow for additional security features.

The calibration element may be a two-dimensional object (or multiple objects), which one or more processors may use to calibrate a given sensor. Depending on the installation, it may be desirable to utilize pre-existing infrastructures such as billboards, traffic signs/lights, building facades etc. as a backplane for the calibration pattern. In so doing, the calibration element may simpler and more cost-efficient. The calibration element may be supported from a point of fixation by a supporting element. It may be desirable that the calibration element is easily distinguishable from the supporting element, such as by color, material, or shape. Such ability to be easily distinguishable from the supporting element may improve clarity in the calibration process. It is anticipated that the calibration element may be mounted outside, and depending on the specifics of a given implementation, it may need to be weatherproof or weather-resistant to withstand inclement weather conditions. According to one aspect, this may be achieved, at least in part, by selecting a material for the calibration element having at least one of the following qualities: moisture-resistance, glare resistant (or insensitivity to glare), fade resistance (or fade resilience), scratch/scuff resistance (or scratch resilience), wind-resistance, impact-resistance, theft-resistance, or any combination thereof.

Particularly in circumstances in which cameras, LIDAR, or other sensors are used, it may be desirable for the calibration element to function in various weather conditions such as fog, rain, and snowfall. Such weather conditions may offer particular difficulties regarding the use of visual patterns (camera, Lidar), since they may impair visibility. It may thus be desirable to place the calibration element within close proximity to the road, to minimize any deleterious effects of fog, rain, and snowfall, or any other weather condition that may result in decreased visibility.

A. Camera Calibration

The calibration element may include a calibration pattern, which may be one or more visual patterns to calibrate cameras or other sensors. These may include a specific pattern, which may simplify inference of intrinsic and extrinsic calibration information, such as by using a geometry that is regular and well known. For example, it is known to utilize a chessboard pattern with quadratic black and white squares for multiplane calibration. Such pattern may be attached to a flat two-dimensional backplane, e.g. a board of a robust material.

In a visual pattern implementation, the exact design of the calibration pattern may be selected for a given implementation. Although a chessboard pattern is common for such implementations, a wide variety of patterns are known, including, but not limited to, patterns of regularly interspersed circles, patterns of codes (e.g., 3D codes or QR codes), three-dimensional illusion patterns, etc. The calibration pattern may be essentially one-dimensional, two-dimensional, and/or three-dimensional. That is, the calibration pattern may include one-dimensional lines or preferably least two-dimensional shapes, which are spatially arranged in a manner that is known to the unit that is performing a calibration operation based on the calibration pattern. Any suitable calibration pattern may be used without limitation.

B. Lidar Calibration

As a general proposition, a calibration pattern that is suitable for a camera may also be suitable for calibrating LIDAR. For example, the one or more processors may use a 2D chessboard pattern in a material to which LIDAR is sensitive. As a general concept, most calibration patterns that can be perceived by a camera are also likely to be suitable for LIDAR. Nevertheless, it may be desirable to select a calibration pattern that is more closely tailored to that which LIDAR can perceive. It may be desirable to select a calibration pattern by taking into account the reflectivity of the material/surface used in the calibration pattern and its impact on LIDAR detection. For example, spectral surfaces (e.g., mirrors and glass when viewed off-axis) may reflect LIDAR beams away from the LIDAR device, with little to no light dispersion, thereby making such surfaces difficult for LIDAR to detect. Similarly, calibration patterns may be selected based on the angular resolution of the intended LIDAR instrument and/or possible ambient interferences.

LIDAR sensors are, however, generally sensitive to a variety of materials and can inherently infer geometric information relating to shape, distance, orientation and position from intensity edges. The skilled person will understand the materials and configurations of a calibration pattern that can be perceived by LIDAR, and therefore the details of which will not be included herein.

C. Radar Calibration

Radar sensors are sensitive to certain materials, such as metals. To maximize the accuracy, precision, and readability of the calibration pattern, and in certain implementations, it may be desired for the calibration pattern to be of regular shape (e.g. having recurring shapes; shapes at fixed, uniform intervals; or shapes arranged or ordered according to an established rule) with good reflectivity. In other implementations, however, and considering that typical Radar resolutions may not be sufficient for detecting fine-grained metallic squares, it may be sufficient and even desirable to use a spatial array of reflectors that are arranged in a known pattern. For example, and according to one aspect of the disclosure, the calibration pattern may include a plurality of conductive triangular trihedral corner reflectors that are arranged in a known, regular pattern. Said corner reflectors may be attached to a two-dimensional board to form a quasi-two-dimensional plane. Because the reflectivity may vary with the detection angle, it may be necessary to consider the orientation of the calibration element towards the road.

According to one aspect of the disclosure, a single calibration element may be configured as a group calibration element that includes multiple calibration patterns. The calibration patterns in such a group calibration element may be configured to enable calibration of a plurality of different sensor types. For example, a group calibration element may include a first calibration pattern suitable for calibration of a camera (image sensor), a second calibration pattern suitable for calibration of Radar, a third calibration pattern suitable for the calibration of ultrasound, or any combination thereof. Such combination of calibration patterns for a variety of sensors onto a single calibration element may have the advantage of reducing the number of calibration elements needed to be distributed. It may also permit simultaneous calibration of all sensors with respect to each other and/or homogenization of calibration code information, which will be discussed in greater detail, below. In addition, it may be possible to use multiple calibration elements to improve the calibration quality (i.e. accuracy of feature calibration improves, or calibration of a certain feature is enabled by using multiple elements, e.g. by considering depth information). For example, a vision-based calibration element (e.g., a calibration element for one or more cameras) may be combined with a calibration element for LIDAR, wherein the resulting calculations (e.g., spatial calculations for a camera; depth calculations for two or more cameras, stereo camera, depth camera, etc.; and/or depth and spatial calculations for LIDAR) may be resolved to improve the quality of the calibration results. This may additionally or alternatively be employed for a vision-based calibration element and Radar, and/or for a vision-based element, Radar, and LIDAR.

When operating in mode B, that is, if the sensor to be calibrated is an infrastructure sensor, it may be desirable for a traffic participant actively involved on the road to carry the calibration element, such that usage of the calibration element does not prevent the infrastructure from performing its role of detecting, identifying and tracking vehicle participants. Therefore, it may be necessary to take special consideration of the calibration element, its size, placement and content. It might also require the training of the detection algorithms for this kind of situation. Alternatively, the infrastructure could enter maintenance mode, briefly disabling the functionality.

Integration in existing infrastructure in mode A: In addition to adding new calibration elements to roadside infrastructure elements, existing roadside infrastructure elements may be re-used to enable online self-calibration. In particular, standardized signs, lane markings and guardrails can be used. This may be desirable, since said infrastructure element is already available and thus can be utilized at zero, or nearly zero, cost. For example, a Lidar device can detect standard road signs, and one or more processors can use the formed pattern to calibrate a Lidar sensor. This can be applied to virtually any existing sign. As is described herein, it may be necessary for the calibration device to know the dimensions of a calibration pattern. This can be achieved as described herein by adding a sensor-readable symbol to the calibration element/calibration pattern. Alternatively, however, and to the extent that traffic sign sizes are standardized, the sensor calibration device may be configured to recognize one or more signs (i.e., traffic control signs). The device may know the standard dimensions of said one or more signs, or may be able to download the dimensions of said one or more signs. Using said dimensions, the calibration device may be able to perform the calibration steps described herein.

The calibration code may be a means by which information corresponding to the calibration element is provided to one or more sensors and/or the one or more processors that process sensor data from the one or more sensors. The calibration code may be provided to the sensors/processors at least in a visual manner and/or via a wireless transmission. For example, the information may be provided as part of a code (e.g., a barcode, a QR-code, or any other code), or may be transmitted wirelessly from a beacon or other means or wireless transmission. Alternatively, the code may be stored in a memory, such as a vehicle memory or as part of a map.

The code may include a one-dimensional or two-dimensional formation of known coding elements. According to one example, the coding elements may be denoted by varying intensity and/or color. According to another example, the coding elements may be denoted by reflectivity (i.e., in the case of LIDAR or Radar). The code may include any of a signature, which may be used to identify a given calibration element as valid (e.g. a hash to be decoded for authenticity); specifications of the calibration element (e.g. the individual square dimensions of the calibration pattern in case of a chess board pattern or QR code); the targeted sensor(s) for the given calibration element; the pose (yaw, roll and/or pitch angle) of a portion of the calibration element (e.g., the center of the calibration pattern relative to a given predetermined reference point, such as (A) a closest road segment and/or (B) an underlying test vehicle); an exact location in a two-dimensional or three-dimensional space (e.g., in x, y (and z) coordinates) of a center of the calibration pattern relative to a predetermined reference point. According to one aspect, the predetermined reference point may be the same reference point as is used for pose, above.

Such symbols can be, for example, camera sensor readable, in a barcode format, in QR code format, or in any other code format. It may be desirable to place the calibration code in close vicinity to the calibration pattern so that both can be readily read from a single camera frame. Similarly, a Lidar sensor can read out a barcode or barcode-like pattern that is slightly offset with respect to a backplane of the calibration element for additional depth.

For Radar sensors, and according to one aspect of the disclosure, reading the calibration code may present various challenges that may be specific to Radar. Due to the nature of Radar readings, it may be desirable to make a calibration code (e.g., a barcode) larger than may otherwise be used/necessary for other sensors. This is not expected to be a limiting factor in the use of barcodes for Radar calibration; however, said barcodes may need to be configured as macroscopic barcodes. According to another aspect of the disclosure, other sensor modalities may be used to read the barcode, and this information may then be used for Radar calibration. For example, in one configuration, a macroscopic barcode may be created, such that it can be read by Radar, and the information derived from the Radar-reading of the macroscopic barcode may be used to interpret the configuration pattern. In another configuration, however, one may use a visually-readable (e.g., readable by a sensor) barcode or QR-code, and the one or more processors may utilize information derived from an image-sensor reading of said barcode or QR-code to interpret the Radar-reading of the configuration pattern. Alternatively (for example, in mode B), the target vehicle may send relevant information via a wireless channel to an infrastructure edge node attached to the sensor, or the information may be already present/stored in the infrastructure in advance.

The one or more processors may read/determine the calibration code from sensor data representing an image (e.g., camera image, LIDAR image, Radar image, etc.) of the calibration code. The calibration pattern (whether of itself or as part of the calibration code) may include a verification signature, which may provide information about the authenticity/validity of the calibration. By checking the signature of the label, is may be determined whether the structure is indeed valid for calibration. If the signature is invalid, the structure may be ignored. If desired for a given configuration, an invalid signature may be reported to a central data center, which may be used to warn other road users of an invalid calibration device and/or to prompt an authority to replace the calibration device. If the signature is proper, then the device may proceed with calibration.

With the embedded information from the code, the targeted sensors perform multi-sampling of the calibration structure while the vehicle (i.e. the host vehicle in mode A, or the detected vehicle with pattern in mode B) passes by.

The one or more processors may use these sensor samples (from the multi-sampling) to estimate the calibration parameters of the target sensor(s) using a multiplane calibration algorithm, which will be described in greater detail, below. The one or more processors may estimate extrinsic and/or intrinsic sensor parameters therewith, where the number of degrees of freedom may depend on the sensor model. For example, for a camera, in the case of a pinhole geometry with principal point offset, there may be three intrinsic parameters (focal length, two-dimensional principal point). The extrinsic parameters may be represented by 6 degrees of freedom (3 angles of rotation and three-dimensional translation vector). This analysis may require knowledge about the true size of the elements in the calibration pattern (such as the size of the squares in a chessboard pattern), which may generally be determined from the calibration code, or, if the calibration pattern is a standardized sign, the dimensions of said sign.

Once the calibration parameters have been successfully estimated, the extrinsic (and intrinsic for camera) sensor parameters for each of the individual samples may be known. For cameras, this provides a result for the intrinsic parameters directly. In contrast, for the extrinsic parameters, a pose of the sensor with respect to the vehicle or the road orientation may be particularly relevant, rather each temporary position of the calibration structure. To achieve this, another step of pose reconstruction may be employed, as will be explained in greater detail, below. The pose reconstruction may be achieved using slight different procedures for mode A and B. At this point, all calibration parameters of interest may have been ascertained. Said parameters may be compared to the expected sensor parameters, and corrected if necessary.

Figure 5:
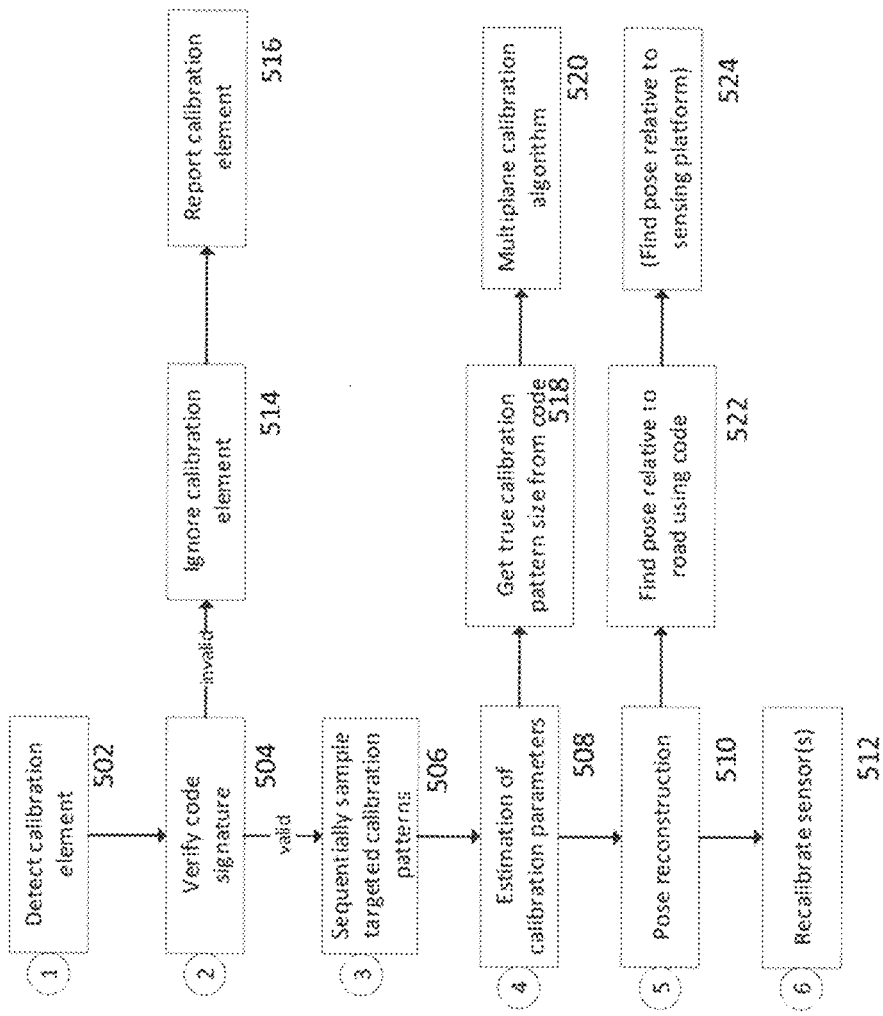
FIG. 5 depicts a process flow of a dynamic calibration method.

FIG. 5 depicts a process flow of a dynamic calibration method, according to an aspect of the disclosure. The process depicted herein may be applied to mode A and/or mode B. According to this process, a sensor may identify a calibration element in its field of view 502. The sensor may be configured with one or more software components, which may trigger the sensor's detection of the calibration structure. Alternatively, one or more processors may be configured to constantly, routinely, periodically, or at any other static or varying internal, analyze sensor data from the one or more sensors to detect the calibration element.

First, the one or more sensors may detect the calibration element 502. Detection may occur through any one or more sensors as described herein. Said sensors may include, but are not limited to, image sensors, cameras, LIDAR sensors, Radar sensors, one or more wireless receivers, one or more wireless transceivers, etc. Once the one or more sensors have detected the calibration element, the one or more processors may extract the code from the sensor data of the calibration element open but the seas or from another source if different sensors are used to obtain the calibration element and the code), and the one or more processors may verify the code signature 504. Assuming that the code signature can be verified, multiple samples of the targeted sensor or sensors may be obtained 506. The one or more processors may be configured to control one or more sensors to obtain sensor data of the calibration pattern, or the one or sensors may be configured via one or more computer readable instructions to obtain images of the calibration pattern. The one or more processors may estimate the calibration parameters from one or more of the sampled targeted calibration patterns 508. Based at least on the estimation of calibration parameters 508, the one or more processors may carry out a pose reconstruction 510. Using the calibration parameters and pose reconstruction, sensors may be recalibrated 512. If the code signature cannot be verified 504, the calibration element may be ignored 514. In some implementations, it may be desirable for the device to further report the ignored calibration element to one or more authorities 516. Once the one or more processors estimates the calibration parameters 508, the one or more processors may obtain a true calibration pattern size from the code 518. Using the estimation of calibration parameters and the true calibration pattern from the code, the one or more processors may carry out a multiplane calibration algorithm 520. Once the pose reconstruction is complete 510, the one or more processors may determine the pose relative to the road 522. Optionally, the one or more processors may calculate the pose relative to a sensing platform 524. For camera sensors, both the intrinsic and extrinsic calibration parameters may be estimated using a multiplane calibration algorithm. For Lidar and Radar sensors, it may only be possible to calibrate the extrinsic parameters.

One or more known calibration procedures can be used to perform the actual parameter estimation, without limitation. Parameter estimation using camera data will be described in greater detail, below. For Lidar and Radar calibration, one set of steps for parameter estimation may be to utilize 6 degrees of freedom. For simplicity, these methods of parameter estimation will be referred to herein as multiplane calibration, without respect to any particular type of sensor.

One known method of multiplane camera calibration is to use one or more calibration patterns, which may include, but are not limited to, checkerboard/chessboard patterns. Other common calibration patterns include repeated rows of horizontal or vertical lines, repeated rows of dots on a contrasting background, and/or various stereoscopic patterns. The principles of multiplane calibration may be applied to many different calibration patterns, and therefore any specific calibration pattern discussed herein is included for demonstrative purposes only and is not meant to be limiting.

The one or more processors may perform such multiplane calibration using any of a plurality of techniques, without limitation. One such technique is known as Zhang's method, which performs calibration using multiple perspective views of the same plane (e.g., multiple views of a calibration pattern, for example, a chessboard, from different angles). Zhang's method may utilize these images to solve a homogeneous linear system that captures homographic relationships between multiple perspective views. Although Zhang's method is referenced herein, a plurality of multiplane calibration methods are known, any of which may be used as desired for the given implementation. Any references to a specific multiplane calibration technique are provided for demonstrative purposes and are not intended to be limiting.

The specific multiplane calibration technique notwithstanding, the input to the algorithm may be a set of multiple images of a calibration pattern (e.g., a planar chessboard pattern or other suitable calibration pattern, without limitation), at different orientations and distances, and the knowledge of the true square width. The multiplane calibration method employed may output estimates of the calibration parameters, where the extrinsic parameters (translation, rotation) refer to each individual image, respectively. The number of intrinsic parameters depends on the camera model, and can vary between 1 and 6 degrees of freedom for finite camera models. The more parameters have to be estimated, the more input images are needed. Additional pictures are likely to substantially improve the accuracy of the estimation.

The estimated extrinsic calibration parameters give the distances and pose of the sensor relative to the detected calibration pattern, for each sensor sample. Due to the dynamics of the system, the relative pose changes over time. Errors in the pose detection of the calibration element will translate into errors of the sensor pose calibration.

For the principles and methods of self-calibration as described herein, the sensor pose relative to the orientation of the road may be of particular interest. Conversely, a lateral position of the vehicle on the lane may be comparatively insignificant. In mode B, the sensor pose relative to the road orientation may provide a meaningful calibration pose for infrastructure sensors. In mode A, the pose of the sensor with respect to the heading of its host vehicle may be the desired calibration parameter. Assuming that the heading of the vehicle during the calibration process is aligned with the orientation of the current road segment the host vehicle is passing, the calibration with respect to the road orientation may be expected to also yield a reasonably accurate estimate of the calibration with respect to the heading of the host vehicle. Alternatively, if available, the relative pose of the vehicle heading with respect to the road orientation can be extracted from vehicle sensors, such as, for example, lane marker detectors and/or IMU sensors.

This system may include tolerance for expected deviations in alignment and/or location. Even if the heading of the vehicle (in either of the modes A and B) is not perfectly aligned with the road orientation at every sample taken of the calibration element, averaging across multiple samples may mitigate the effect of these deviations. Nevertheless, and in order to maintain a desirable level of accuracy, it may be important that the vehicle's heading relative to the road orientation does not significantly change during the sampling process. That is, better results are expected if the vehicle generally avoids maneuvers that significantly change its heading with respect to the road orientation (i.e., lane changes, turns) during the sampling process.

The following is a description of pose reconstruction with respect to the road orientation. For the two modes, A and B, slightly different transformations may be used. In mode A, the following steps may be performed. First, for each sample, the one or more processors may obtain extrinsic calibration pose relative to the calibration pattern from the detected calibration element. The one or more processors may read out the pose (yaw, pitch, roll angles) of the calibration pattern relative to the closest road segment from the code of the calibration structure. The one or more processors may use this information to rotate the calibration element sample into a plane that is perpendicular to both the road surface and the road orientation ("normalization of pattern plane"). The one or more processors may then calculate the intersection of the optical axis of the sensor with the normalized pattern plane. This yields the yaw and pitch angle of the sensor pose relative to the road orientation. The one or more processors may infer the roll angle by comparing the corner positions of the normalized calibration pattern.

Figure 6:
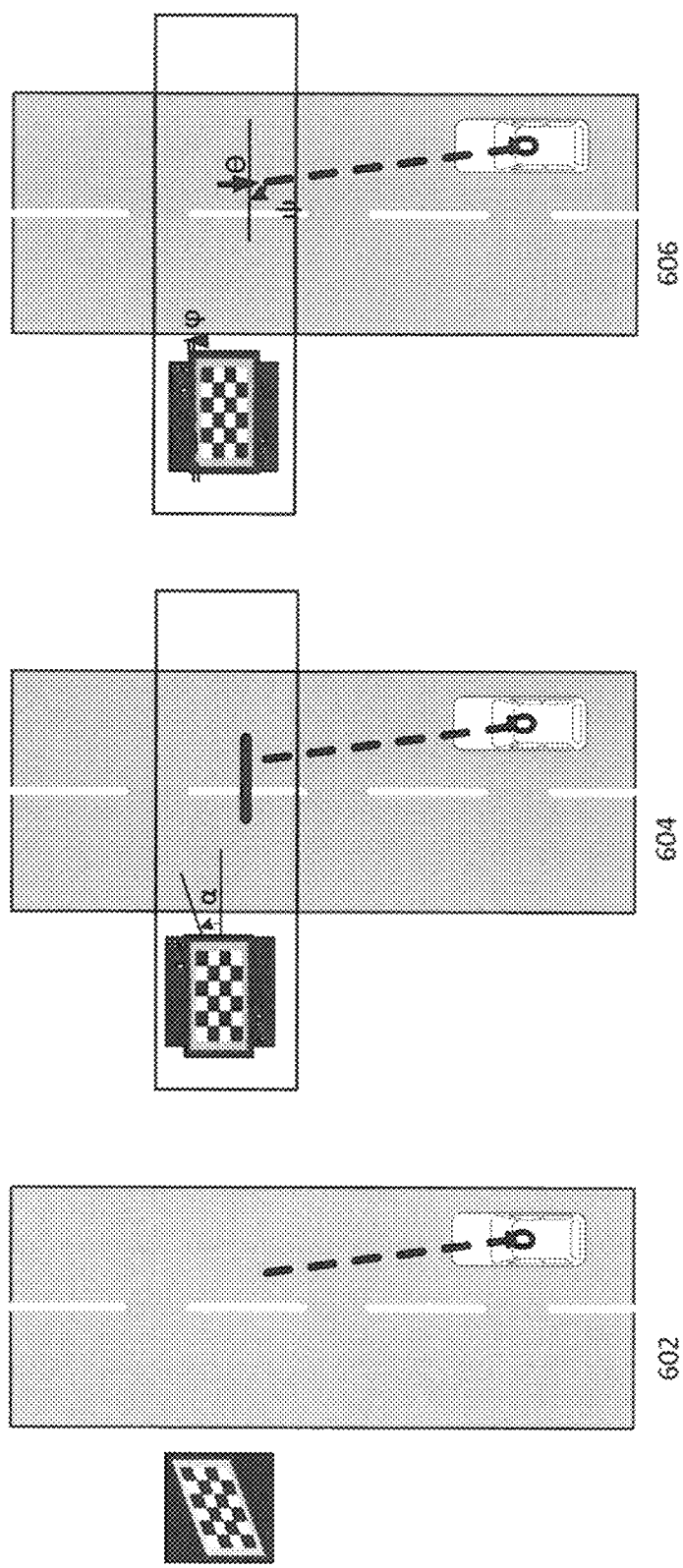
FIG. 6 shows a pose reconstruction with respect to the road orientation.

FIG. 6 shows a pose reconstruction with respect to the road orientation according to an aspect of the disclosure. This method of pose reconstruction may be appropriate for use with, for example, mode A. One or more sensors (e.g., camera, image sensors, LIDAR, Radar, etc.) may detect the calibration pattern. Once detected, the one or more processors of the device may normalize the pattern plane of the calibration pattern. This is depicted in FIG. 6 only with respect to the yaw angle $\alpha$, for simplicity, but normalization may be performed for any or all of $\phi$ (roll), $\psi$ (yaw), $\Theta$ (pitch). Thereafter, the pose estimation may be performed relative to the normalized pattern plane. In FIG. 6, the vehicle is operating in mode A, and it perceives and detects the calibration pattern 602. The image of the calibration pattern is normalized (normalization is only demonstrated relative to yaw angle in the FIG. 604. The normalized pattern is assessed for pose estimation.

A second method of pose reconstruction may be performed, such as during operation in mode B. First, for each image, the pattern is detected by one or more sensors (e.g., camera, image sensors, LIDAR, Radar, etc.). Using the detected pattern, one or more processors assess data representing the detected pattern and determine therefrom the extrinsic calibration pose relative to the pattern. The one or more processors may read out the pose (e.g., yaw, pitch, roll angles) of the calibration pattern relative to the underlying host vehicle platform from a code on or associated with the calibration structure. The one or more processors may use this information to rotate the calibration pattern image into a plane that is aligned with the heading of the host vehicle, and orthogonal to the road surface (normalization of pattern plane). In contrast to mode A, the normalized calibration plane is now parallel to the vehicle heading, which may also be assumed to be parallel to the road orientation. Temporary misalignments of the vehicle heading with the road orientation may be accounted for by averaging across multiple frames. Again, the one or more processors may calculate the intersection of the optical axis of the sensor with the normalized pattern plane. This may yield the yaw and pitch angle of the sensor pose relative to the road orientation. The one or more processors may infer the roll angle by comparing the corner positions of the normalized calibration pattern. This procedure for pose reconstruction is depicted in FIG. 7.

Figure 7:
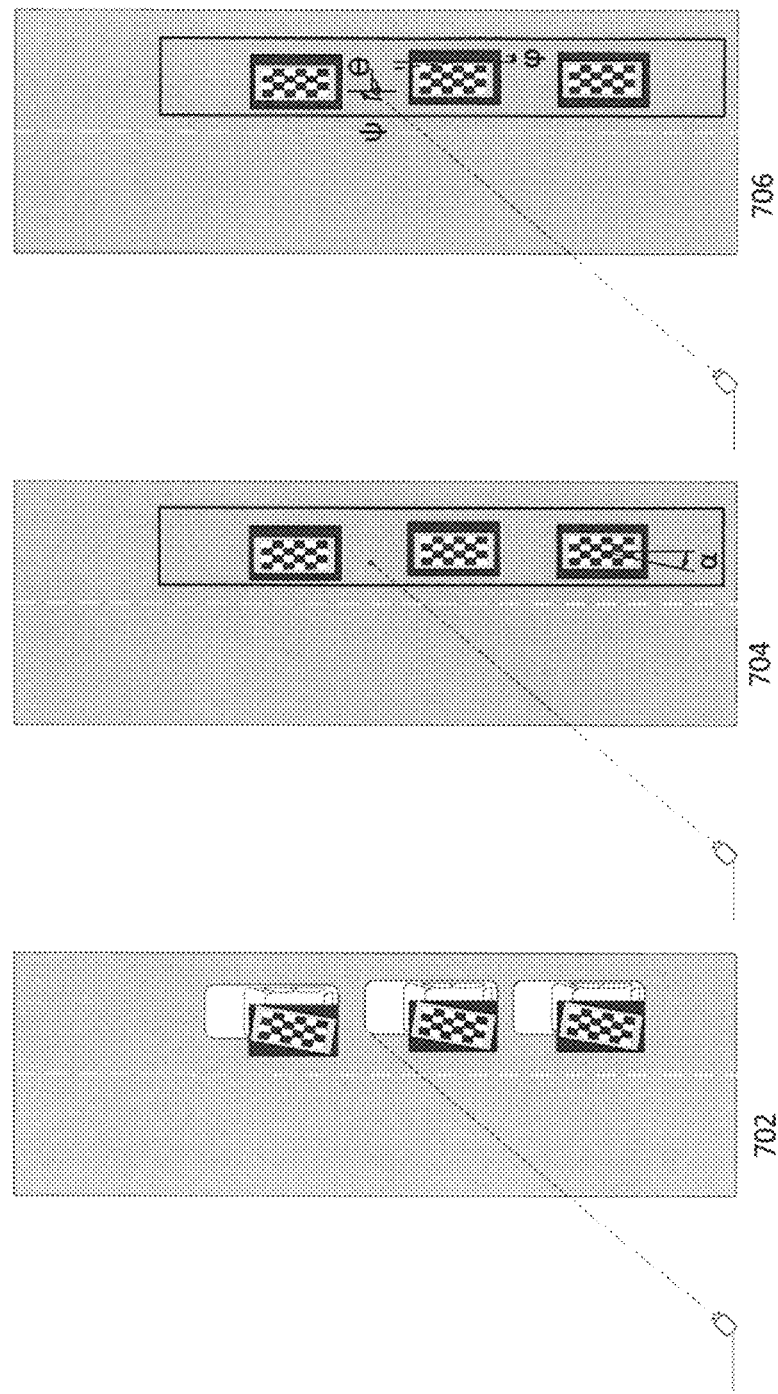
FIG. 7 shows a method of pose reconstruction of a calibration target.

FIG. 7 shows a method of pose reconstruction of a calibration target, according to an aspect of the disclosure. This method may be suitable at least when the calibration device is an infrastructure element and the calibration pattern is attached to a moving vehicle (mode B). The infrastructure element may be configured with one or more sensors to detect a calibration pattern (e.g., camera, image sensors, LIDAR, Radar, etc.). A calibration pattern may be attached to a moving vehicle, such that the infrastructure element can detect the moving pattern 702 (showing a moving vehicle with a calibration pattern being detected during multiple sensor data samples). Once the one or more sensors/one or more processors detect the calibration pattern, the one or more processors of the infrastructure element may normalize the calibration pattern relative to the infrastructure element 704. The normalization of the calibration pattern may include normalizing the calibration pattern relative to a normalized pattern plane. The normalized pattern plane may be, for example, a plane perpendicular to a direction of the roadway. For simplicity, only normalization of roll angle α is depicted in 704, although yaw and/or pitch may also be normalized. The pose angles are denoted φ (roll), ψ (yaw), Θ (pitch). In contrast to mode A, the normalized calibration plane may be oriented towards the vehicle heading, i.e. the road orientation.

Figure 8:
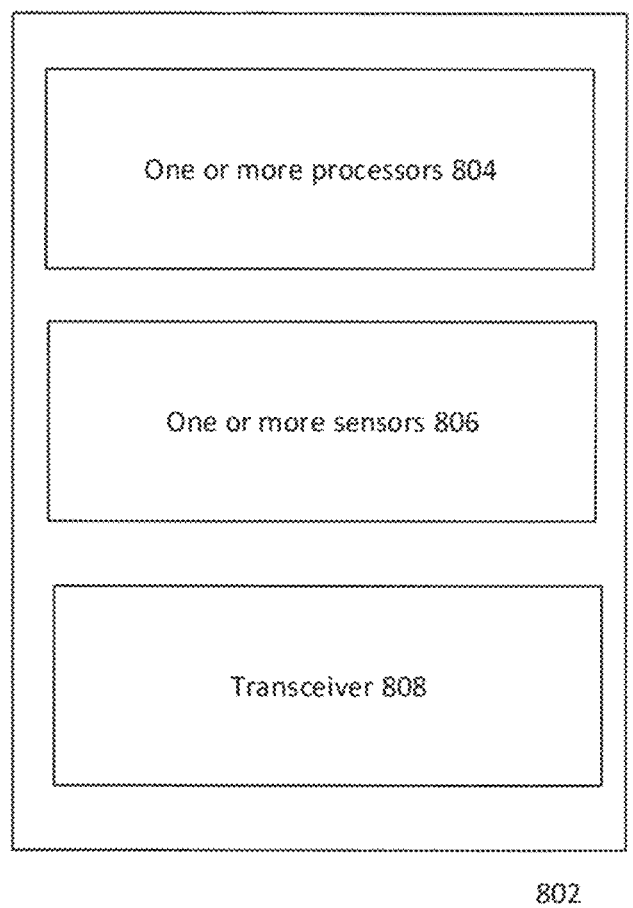
FIG. 8 shows a sensor calibrator 802 including one or more processors.

FIG. 8 shows a sensor calibrator 802 including one or more processors 804, configured to receive sensor data representing a plurality of images of a calibration pattern taken during a period of relative motion between a sensor and the calibration pattern in which the sensor or the calibration pattern move along a linear path of travel; determine a calibration adjustment from the plurality of images; and send a calibration instruction for calibration of the sensor according to the determined calibration adjustment. The sensor calibrator 802 may be a processing device only, in which sensor data is sent to the one or more processors and processed as described herein. Alternatively, the sensor calibrator 802 may optionally be configured with one or more sensors 806, which may be configured to detect sensor data representing a vicinity (e.g., an environment) of the sensor calibrator 802 and/or of a vehicle. Said one or more sensors 806 may be configured to output sensor data, which is then processed by the one or more processors 804. The sensor calibrator 802 may optionally include a transceiver 808, which is configured to send data and/or receive data. For example, the sensor calibrator 802 may be configured to control the transceiver 808 to send and/or receive data, such as sending a representation of a calibration code and/or a representation of a calibration pattern and/or receiving data representing a verification or rejection of the sent representation of the calibration code and/or the representation of a calibration pattern.

Figure 9:
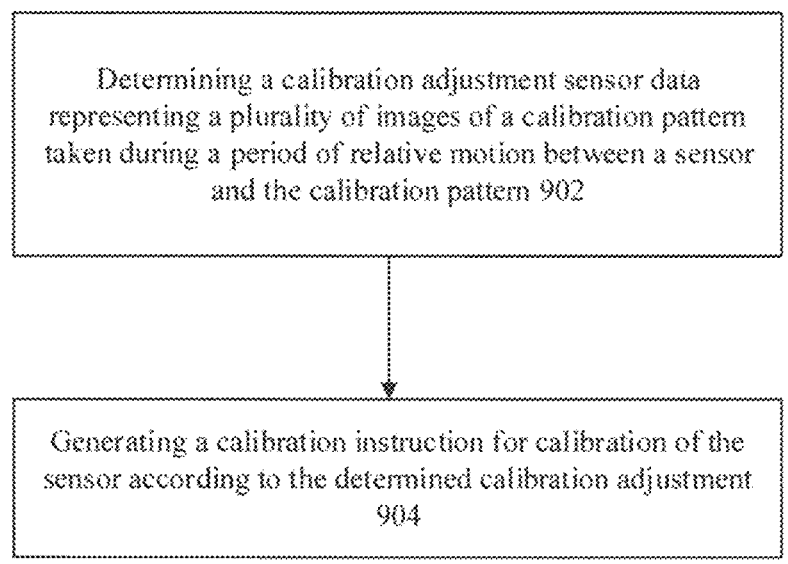
FIG. 9 shows a method of sensor calibration.

FIG. 9 shows a method of sensor calibration including determining a calibration adjustment sensor data representing a plurality of images of a calibration pattern taken during a period of relative motion between a sensor and the calibration pattern 902; and generating a calibration instruction for calibration of the sensor according to the determined calibration adjustment 904.

In any automated or semi-automated calibration system, malicious attack may be a danger. For example, malicious attempts may be made to compromise the calibration element and code, thereby harming the calibration process. Attention is now turned to various potential attacks and measures that can be taken to prevent or ameliorate them.

As a first kind of attack, parts of the calibration pattern may be physically covered/distorted to reduce the likelihood of a successful calibration. To counteract this type of attack, an optional measure may be taken, such that the one or more processors only perform a calibration if a number of detected calibration patterns is beyond a predetermined threshold. For example, calibration can be prevented unless the number of detected calibration patterns is greater than 2, greater than 5, greater than 10, or any other number that is selected for the implementation. If fewer elements than those of the predetermined threshold are detected, the one or more processors may ignore the calibration elements/calibration patterns and/or no calibration may be prevented.

As a second kind of attack, malicious persons may attempt to set up fake/fraudulent calibration elements. Unless the device is able to distinguish between an authentic calibration element and a fraudulent calibration element, the device could attempt a calibration in light of data derived from the fraudulent calibration element, which may lead to an improper calibration. To prevent this, the calibration code may operate as a verification mechanism by incorporating a valid identification. If a fraudulent element does not incorporate such an identification, the device may be configured to ignore the relevant calibration element.

As a third type of attack, it is also conceivable that attackers may attempt to add a valid code (e.g., barcode, QR code, etc.) such as by copying it from a valid calibration element elsewhere. That is, a valid code may be photographed, printed, and placed on a fraudulent calibration element, or otherwise used in an attempt to falsely authenticate a fraudulent calibration element. To guard against unwanted calibration using such a falsely verified calibration element, an additional security layer is needed. This may include embedding the calibration code in the calibration pattern such that it is difficult to copy, or such that an alteration of any of the two would automatically compromise the other. This makes it less likely that the respective attack occurs in the first place. Methods of embedding one code within another are known, and any such method may be used for this purpose, without limitation.

Alternatively or additionally, the one or more processors may be configured to compare a location of a calibration element with one or more known element positions. For example, and according to mode A, the positions of one, a plurality, or all calibration elements may be known (e.g., registered in a map or database that is available to the vehicle, such as via a cloud server). Each vehicle may be configured to compare its own GPS location with the locations of the calibration elements that it detects. If a significant mismatch is detected (e.g., a difference between a detected location and a known, stored location of calibration element beyond a predetermined threshold), the calibration element may be considered fraudulent. Such calibration elements that are considered fraudulent may be ignored and, if desired for the implementation, reported. When operating according to mode B, information regarding the test vehicle (trajectory, location, time of arrival, velocity, or any other information) may be announced to the infrastructure sensors via communication to a wireless edge node. In this manner, the infrastructure element that detects a calibration element on a moving vehicle may also be configured to detect one or more aspects of the vehicle with the detected calibration pattern (e.g., a velocity of the vehicle, a trajectory of the vehicle, a time of arrival of the vehicle, etc.). Assuming a match within a degree of tolerance between the announced information regarding the test vehicle and the detected information about the test vehicle, the calibration element may be considered authentic. If there is a disparity between the announced information regarding the test vehicle and the detected information about the test vehicle beyond a predetermined threshold, the relevant calibration element may be considered fraudulent, disregarded, and/or reported.

The calibration code may be implemented on a display (e.g., a digital display, a computer screen, etc.). If the calibration code is implemented on a display, one or more processors controlling the display may be configured to update the code regularly to avoid abuse. According to this configuration, one or more signatures or identifying features within the code may be changed occasionally or periodically to one or more new signatures or new identifying features from a plurality of valid signatures or identifying features. This may be implemented using any known technology for displaying signatures or identifying features in a visual code, which may include, but is not limited to, the use of a barcode, a QR-code, or otherwise). According to this implementation, replacing a code (signature or identifying feature) may render any prior code invalid to preclude outdated codes from being used to authenticate calibration elements. The change of a code (i.e., the addition of a new code for authentication and/or the invalidity of a prior code) may be communicated to the calibration device (vehicles according to mode A and/or infrastructure elements according to mode B) in a timely manner. If the update interval is sufficiently short, this may render it impossible to copy and improperly use otherwise valid code signatures for nefarious purposes.

According to another aspect of the disclosure, sensor data (e.g., collected environmental data) may be used in conjunction with reference data (e.g., map data or geospatial database(s)) to identify one or more sensors that require calibration and/or to calibrate such one or more sensors. That is, statistical modeling and error propagation may be utilized to perform an automatic sensor calibration methodology for autonomous vehicles. Such calibration may be performed, for example, using data uploaded from peer vehicles. Vehicles are commonly equipped with a plurality of sensors that often, or even constantly, detect sensor information about an environment (e.g., a vicinity) of a vehicle. This information may be used for one or more driving functions (e.g., autonomous or semi-autonomous driving functions). Said detected sensor information may be further used, as described herein, to detect sensors that require calibration and/or to calibrate said sensors.

Many vehicles are equipped with one or more sensors, for example, camera, LIDAR, Radar, etc. Said sensors may be particularly common and of particular importance in autonomous vehicles. As autonomous vehicles become more prevalent, the number of vehicles with such sensors will be likely to increase. Vehicle sensors require periodic calibration. The need for calibration may occur as a result of a strong force imparted to the sensor (e.g., in a collision), simply as a result of use, or otherwise. Although routine maintenance may be performed on one or more sensors according to a predetermined schedule, the point at which a sensor requires calibration may not occur according to a predetermined schedule, and it may be difficult to predict. Thus, it may be desirable to have a simplified manner of determining when a sensor requires calibration.

According to one aspect of the disclosure, one or more processors may perform sensor calibration (e.g., sensors requiring calibration may be calibrated and/or automatic sensor calibration may be performed) using data uploaded from peer vehicles. For example, a plurality of vehicles may travel on a roadway while obtaining image sensor information of the vehicle's surroundings from a particular location on the roadway. A database may store this image data. One or more of said vehicles may frequently pass by the relevant location (i.e., every day or multiple times per day), and data from as often as each passing may be incorporated into the database. By way of non-limiting example, Ordnance Survey, Great Britain's national mapping agency, uses vehicles to map roadways in Great Britain. Data from such services may be utilized along with, or alternatively to, contributions from vehicles that happen to pass by a specific area.

Within the combined image data, one or more image sensors may have undesirable physical offset/rotations whose data lead to system errors. By analyzing the data as described above (e.g., in a Gaussian distribution) these image sensors with offsets/rotations can be identified, since they will be outliers within the data set. Once an outlier has been identified, a notification can be sent that the sensor requires calibration; the data from said sensor may be deleted from the database; and/or steps may be taken to improve the sensor's calibration.

If it is desired to improve the sensor's calibration, it may be preferable to calibrate the sensor automatically (i.e., without manual adjustment from a human). The following describes a procedure for such automatic calibration.

In this manner, a vehicle obtains sensor data, which may be transmitted to a central database. The transmission to the central database may be achieved through any known method of transmission, including, but not limited to wireless radiofrequency transmission, wireless transmission according to Long Term Evolution technology, transmission according to Fifth Generation Wireless Technology (i.e., "5G"), or any other wireless standard.

A central database may incorporate sensor data received from vehicles. One or more processors associated with the central database may be configured to process the received data to determine similarity or differences between data of difference sources. For example, one or more processors may analyze the received data to create a Gaussian distribution of the received data. This analysis is not limited to a Gaussian distribution, but rather may include any method for evaluating a received data sample to determine a threshold of deviation from one or more other data samples in the central database. If a deviation of the received sensor data as compared to other data in the central database exceeds a predetermined tolerance, the one or more processors may identify received sensor data as corresponding to a sensor that requires calibration. For example, the one or more processors may determine a mean/variance of the received sensor data as compared to the data of the central data, and if the mean/variance is outside of a predetermined range (i.e., the mean/variance is "abnormal"), the one or more processors may detect the data outside of the permitted region of the distribution (e.g., using the Wald test), and the one or more processors may generate and/or send a calibration instruction for one more sensors that detected the data having a mean/variance outside of the predetermined range.

The Wald Test is a test to assess constraints on statistical parameters in light of a weighted distance between an unrestricted estimate and its hypothesized value under a null hypothesis, in which the weight is a reciprocal of the variance (e.g., the precision) of the estimate. The one or more processors may use any known implementation or variation of the Wald Test. According to an aspect of the disclosure, it may be desired to use an alternative test for the evaluation of received sensor data as compared to the reference data bank. Such alternative tests may include, but are not limited to, the likelihood-ration test and the Lagrange multiplier test. As these tests are known in the literature, and as the skilled person will understand these tests, they will not be further recited herein.

An automatic sensor calibration methodology for autonomous vehicles that is based on statistical modeling and error propagation is proposed herein. To carry out this methodology, data obtained from a plurality of sources at a common location is modeled, such as by using a Gaussian distribution. In theory, this data can be essentially any kind of sensor data that can be obtained by multiple entities from a common location (i.e., at differing times). This may be, for example, image sensor (camera, LIDAR, Radar, etc.) data of a vicinity of a vehicle. For example, plurality of vehicles may be equipped with one of more image sensors, and this plurality of vehicles may occasionally, periodically, or constantly detect image sensor data representing a surrounding of the vehicle. Assuming that image sensor data from a common location is received (e.g., each vehicle may take a picture (or otherwise detect sensor information) of the same building or intersection when the vehicle passes by the building or intersection), this data should be identical or nearly identical, or at least show substantial similarity. If the sample size is sufficiently large, the data can be arranged by similarity (e.g., in a Gaussian distribution), which allows outlier data to be identified.

Once the data is collected, one or more processors may determine a mean and/or variance of the data. The one or more processors may determine out-of-distribution data using the Wald test. Should outlying data be found, the one or more processors may attribute the outlying data to a sensor problem (i.e., sensor calibration).

The one or more processors may identify the one or more problematic sensors by using an error propagation method. The error propagation method may optionally be configured to identify sensors whose data are outliers relative to the Gaussian distribution for a predetermined length of time. In other words, and according to one aspect of the disclosure, only the abnormal sensors whose performance is problematic for a certain period, rather than just one or two times, may be identified as requiring calibration. This may allow for the distinction between systematic error and stochastic noise.

According to one aspect of the disclosure, the data for the database (i.e., the normalized data or data in the Gaussian distribution) may be obtained from one or more local agencies and/or governmental agencies. Such agencies may readily have access to such data and thus be a convenient for of data for the principles and method disclosed herein. For example, various efforts to map regions, cities, states, countries, or otherwise have utilized vehicles to periodically photograph an area to be mapped. This data, by virtue of the fact that it is likely to have been taken on a roadway, is likely to resemble data from other vehicles traveling on the same roadway at another time. Thus, this data can be used as a reference to which subsequent sensor data can be compared.

To establish a reference, a conventional system without automatic sensor calibration will first be discussed. Each autonomous vehicle may be equipped with an image sensor (e.g., a camera, LIDAR, Radar, etc.) to detect sensor data representing a vicinity of the vehicle (i.e., an area in front of the vehicle). From the detected image data, one or more processors and/or one or more sensors may detect a road infrastructure. The one or more sensors and/or the one or more processors may achieve this, for example, using a computer vision system and deep neural networks, which may be differentiable. The captured image of an $i_{th}$ vehicle may be $x_i$, and an output of the system which is assumed to be the location of a traffic light on a particular sidewalk as $y_i$. Since multiple vehicles may pass the infrastructure, multiple locations $\{y_i\}$ may be provided to the server. If all the sensors and systems are accurate, then the system can directly use any of $y_1 \ldots y_N$ or $1/N \sum_{n=1}^{N} y_i$ as the final result.

Figure 10:
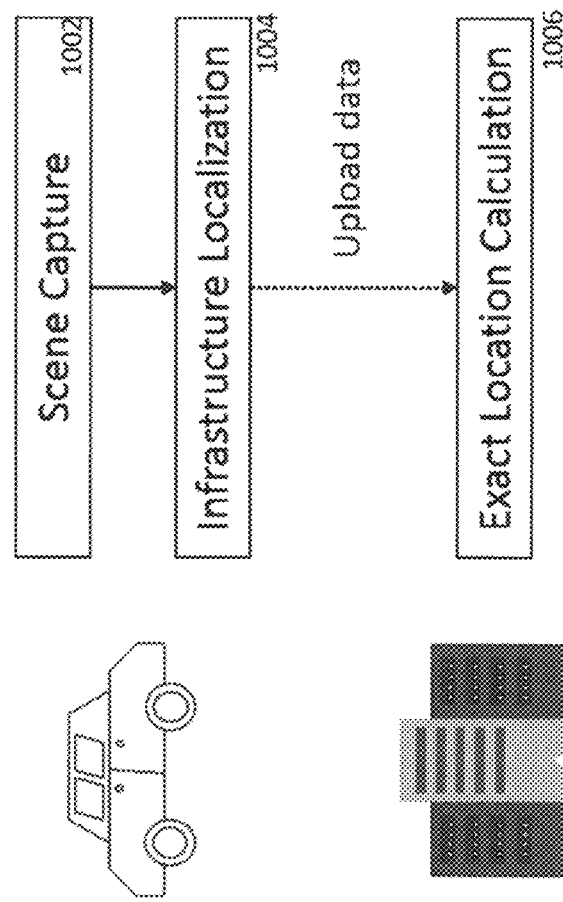
FIG. 10 depicts a procedure for infrastructure localization and location calculation.

FIG. 10 depicts a procedure for infrastructure localization and location calculation, according to an aspect of the disclosure. In this manner, the one or more image sensors may detect image data of a vicinity of the vehicle (e.g., scene capture) 1002. Using said image sensor data, one or more processors may be configured to localize an infrastructure location 1004 from the detected sensor data in the scene capture step. The data may be transmitted to a central databank, which may compare the received data with data stored within the database to determine an offset between the sensor data and the data in the database (exact location calculation) 1006.

Throughout these descriptions, sensor data detected by a sensor to potentially be calibrated will be referred to as "first sensor data". Conversely, previously received sensor data, i.e., sensor data in the central database to which the first sensor data is compared is referred to herein as "second sensor data".

In a given vehicle, it is possible that one more sensors might be physically offset/rotated, which will result in an error component between image data expected from the given location and what the camera actually observes. This can be understood as $x_i=f(z_i;e_i)$, in which f is an affine transformation and $e_i$ is/are its parameter(s). Note that the affine transformation is invertible once $e_i$ is known. Calibration may involve the one or more processors estimating ei and obtaining $f^{-1}(x,e_i)$. That is, the one or more processors may determine the affine transformation or offset between the first sensor data and some measure of the second sensor data (e.g., a mean of the second sensor data, a mean of a subset of the second sensor data, a variation of the second sensor data, etc.). To achieve this goal, the one or more processors may leverage data $y_1 \ldots y_N$ from other vehicles. According to the central limit theorem, one can assume that the distribution of y from normal sensors without systematic error follows a Gaussian distribution. Thus, the one or more processors one can first estimate the mean and variance of the distribution and perform a Wald test or other suitable test to detect out-of-distribution data that is uploaded from vehicles with problematic sensors, for which $$w_i = \frac{(y_i - \bar{y})^2}{\text{var}(y)}$$

is calculated. If wi exceeds a predetermined threshold $\tau$, then it may be considered as a output from a vehicle likely having a problematic sensor. Said vehicle may be treated as "suspect" and an output record of the vehicle's sensor may be tracked. If the subsequent data uploaded by the vehicle is continuously problematic (e.g., determined to be suspect T times in a predetermined time frame, or determined to be suspect in T number of subsequent iterations), the sensor may be designated as a sensor requiring calibration. This procedure allows a measure of distinction between systematic error and stochastic noise, and it permits only sensors with a greater likelihood of systemic error (as opposed to mere stochastic noise) to be designated as sensors requiring calibration.

To calibrate the sensor automatically, the mean of $\{y_i | w_i \leq \tau\}$, which is denoted as $\tilde{y}$, may be leveraged. In this manner, it may be possible to optimize $e_i$, e.g., for a problematic sensor with index i, by back-propagating the error $\tilde{y} - y_i$ through the computer vision system and f to obtain $e_i$. This can be seen in greater detail in FIG. 9.

Figure 11:
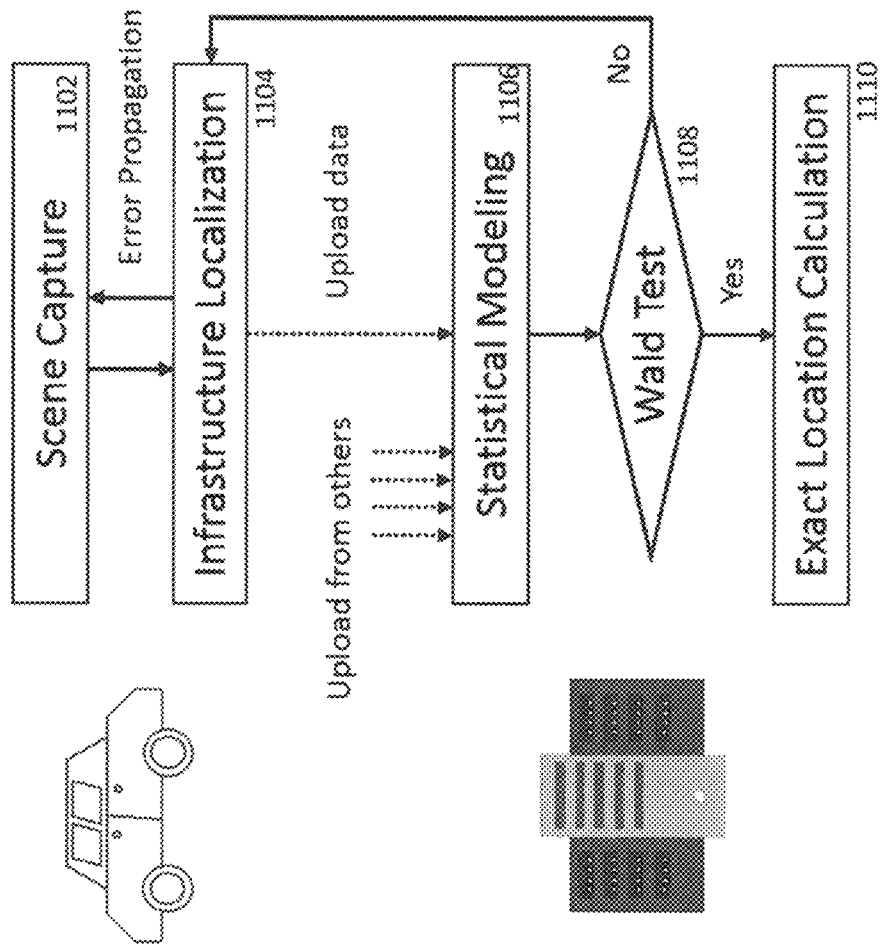
FIG. 11 shows a procedure for sensor calibration.

FIG. 11 shows a procedure for sensor calibration, as described above. In this manner, the one or more sensor (e.g., image sensors) detect sensor information of a vicinity of the vehicle 1102. The one or more processors may be configured to localize an infrastructure detail (a building, landmark, etc.) within the image date 1104. This data may be sent to a central database, where it is compared with other upload data (e.g., from other vehicles) of the infrastructure detail 1106. The central database may be controlled by one or more processors, which may be configured to perform a Wald Test (or other test to compare variance of data compared to a larger data set) on the uploaded data 1108. If the variance between the uploaded sensor data and the database data set is within a predetermined range, then the sensor may be assumed to be acceptably calibrated. If the variance between the uploaded sensor data and the database data set is outside of a predetermined range, then the sensor may be assumed to require calibration. The procedure above may be implemented to determine $e_i$, which may result in a calibration instruction 1110.

It is noted that data sensors themselves can be noisy. As such, it may be desirable to include a system to evaluate the errors at multiple locations or even using data from a plurality of different sensors such as Lidar, Rader et. al. on the same vehicle, and to calibrate them via an ensemble model. That is to say, using this optional methodology, the sensor may only be considered problematic if a measure of the y data is out-of-distribution and if transformation parameters are calculated as the average of estimations at all these locations. In this case, the measure of the y data that must be out-of-distribution can be any measure desired for the implementation, including, but not limited to, a majority of the data, a fixed percent of the data, etc.

Figure 12:
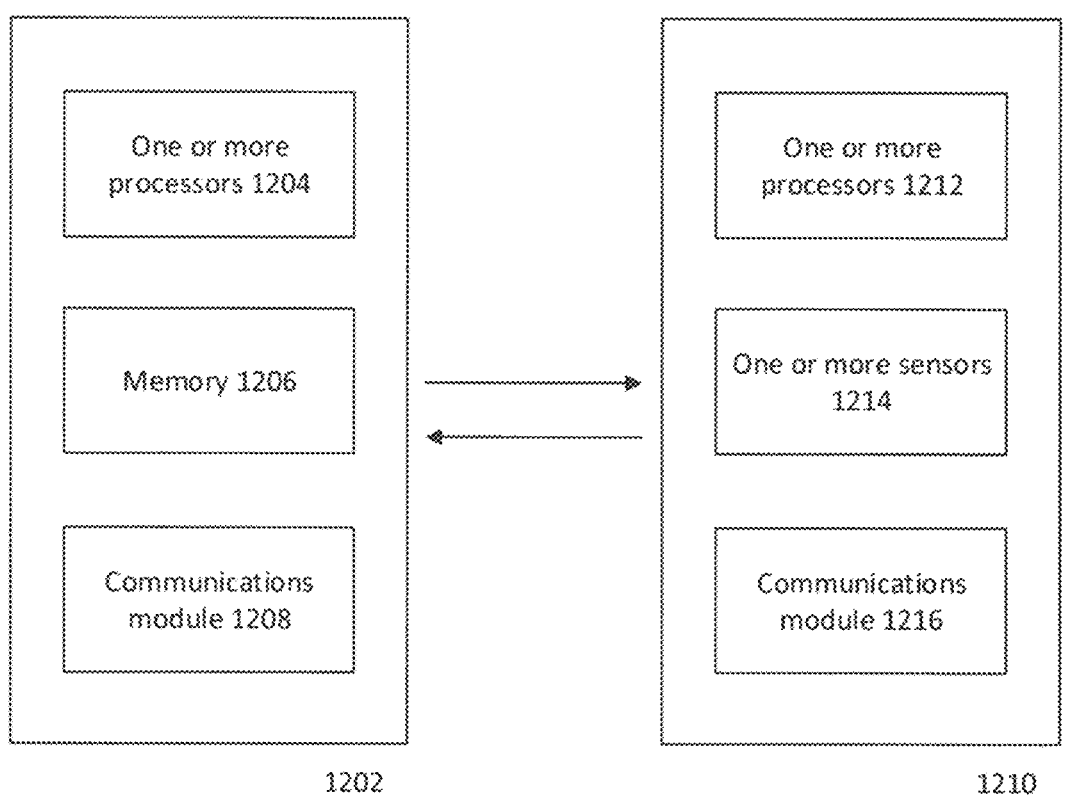
FIG. 12 depicts a sensor calibration detection device.

FIG. 12 depicts a sensor calibration detection device 1202 and an optional sensor calibration detection system. The sensor calibration detection device 1202 may include one or more processors 1204, which may be configured to receive first sensor data detected during movement of a first sensor along a route of travel; determine a variance between the first sensor data and stored second sensor data detected during movement of one or more second sensors along the route of travel; and if the variance is outside of a predetermined range, switch from a first operational mode to a second operational mode. The sensor calibration detection device 1202 may optionally include one or more memory devices 1206, which may be configured to store second sensor data. Said second sensor data may be data from any source or sources, including, but not limited to, one or more vehicle sensors, one or more mapping services/databases, one or more imaging services/databases, or any combination thereof. The sensor calibration detection device 1202 may optionally include one or more communications modules 1208, which may be configured to receive first sensor data from one or more vehicles and/or to send a calibration instruction. The communications module may be a wireless communication module, including a receiver, transceiver, transmitter, baseband modem, or any combination thereof. The communications module may be a wired communications module and may include a baseband modem. The communications module may operate according to any communication protocol, without limitation. Such communications protocols include, but are not limited to, LTE, 4G, 5G, WLAN, Wi-Fi, Transmissions Control Protocol, Internet Protocol, or otherwise.

The sensor calibration detection device 1202 may be optionally configured as a sensor calibration detection system, including the sensor calibration detection device 1202 and a sensor module 1210 (e.g., a vehicle sensor). The sensor module 1210 may optionally include one or more processors 1212, configured to receive sensor data from one or more sensors 1214 representing a vicinity of a vehicle; to detect an infrastructure element in the sensor data; and to control a communications module 1216 to send the sensor data and/or data representing the detected infrastructure element. The sensor module may optionally include the one or more sensors 1214. The sensor module may optionally include the communications module 1216, which may be configured for wired and/or wireless communication. The communications module 1216 may include a receiver, transceiver, transmitter, baseband modem, or any combination thereof. The communications module 1216 may send and/or receive messages according to any communication protocol.

Figure 13:
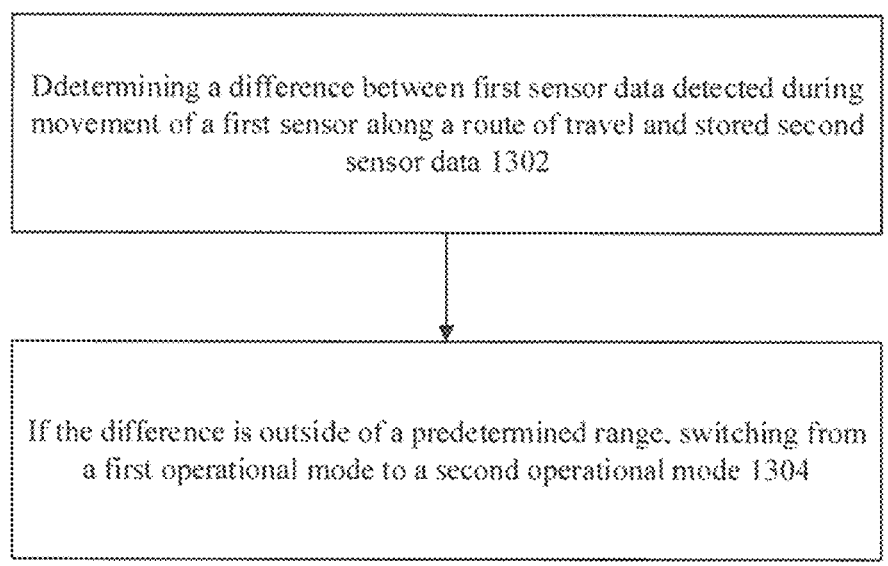
FIG. 13 depicts a method of sensor calibration evaluation.

FIG. 13 depicts a method of sensor calibration evaluation, including determining a difference between first sensor data detected during movement of a first sensor along a route of travel and stored second sensor data 1302; and if the difference is outside of a predetermined range, switching from a first operational mode to a second operational mode 1304.

Any of the principles or methods disclosed herein may be optionally performed as a set of software instructions and may be optionally formatted as a non-transitory computer readable medium containing instructions which, if executed, would cause one or more processors to carry out any of the principles or methods disclosed herein.

Some of the principles and methods disclosed herein describe identification of one or more sensors that require calibration. Other principles and methods disclosed herein include one or more steps to determine a calibration instruction and send said calibration instruction to a vehicle with a sensor to be calibrated. Although the specific implementation of the mechanism by which the sensor is calibrated exceeds the scope of this disclosure, it is generally anticipated that a sensor to be calibrated (e.g., a camera, a LIDAR sensor, a Radar sensor, etc.) may be equipped with a motorized mount, which may be controlled by one or more processors. When the one or more processors receive a calibration instruction, they may control the motorized mount to alter the calibration of the sensor (e.g., the pitch, yaw, and/or roll of the sensor).

Throughout portions of this disclosure, sensor data may be referred to as "first sensor data" and "second sensor data". The first sensor data may be understood at least as data from a sensor whose calibration is being tested, and the second sensor data may be understood as data from a database to which the first sensor data is compared. Because of the nature of this process, and at least due to the fact that some or all of the second sensor data may be obtained by the central database before the first central data, the terms "first" and "second" with respect to the sensor data are not intending to suggest a chronology, but rather are used for identification purposes only.

In the following, various aspects of the present disclosure will be illustrated:

In Example 1, a sensor calibrator including one or more processors configured to: determine a calibration adjustment from sensor data representing a plurality of images of a calibration pattern detected by a sensor during a period of relative motion between the sensor and the calibration pattern in which the sensor or the calibration pattern move along a linear path of travel; and generate a calibration instruction for calibration of the sensor according to the determined calibration adjustment.

In Example 2, the sensor calibrator of Example 1, in which one or more of the plurality of images of the calibration pattern include a symbol representing one or more physical attributes of the calibration pattern, and in which the one or more processors are configured to determine the calibration adjustment from the plurality of images and the one or more physical attributes of the calibration pattern.

In Example 3, the sensor calibrator of Example 2, in which the symbol includes at least one of a two-dimensional bar code, a three-dimensional bar code, or a QR-Code.

In Example 4, the sensor calibrator of Example 2 or 3, in which the one or more physical attributes of the calibration pattern include any of a type of calibration pattern, and one or more dimensions of the calibration pattern.

In Example 5, the sensor calibrator of any one of Examples 1 to 3, in which the symbol further includes data representing a linear direction of a roadway in a vicinity of the calibration pattern.

In Example 6, the sensor calibrator of any one of Examples 1 to 5, in which the one or more processors are further configured to determine a pose of the calibration pattern relative to the sensor using at least one of the plurality of images of the calibration pattern, and to determine the calibration adjustment from at least one of the plurality of images of the calibration pattern and the determined pose.

In Example 7, the sensor calibrator of any one of Examples 2 to 6, in which the one or more processors are further configured to determine the pose of the calibration pattern relative to the sensor using at least one of the plurality of images of the calibration pattern and the symbol and to determine the calibration adjustment from the plurality of images of the calibration pattern and the determined pose.

In Example 8, the sensor calibrator of Example 6 or 7, in which determining the pose of the calibration pattern includes determining an angle of an intersection between a normalized plane of the calibration pattern and an optical axis of the sensor; and in which the one or more processors are further configured to determine the calibration adjustment from the angle of intersection.

In Example 9, the sensor calibrator Example 8, in which the symbol further represents a linear direction of a roadway and/or a linear path of travel, and in which the one or more processors are further configured to determine the calibration adjustment from the angle of intersection and the linear direction of the roadway or the linear path of travel.

In Example 10, the sensor calibrator Example 8, in which the one or more processors are further configured to determine the calibration adjustment from the angle of intersection and the linear path of travel.

In Example 11, the sensor calibrator of any one of Examples 6 to 10, in which determining the pose of the calibration pattern includes determining one or more of a yaw, a roll, or a pitch of the calibration pattern relative to the sensor.

In Example 12, the sensor calibrator of any one of Examples 1 to 11, in which the one or more processors are further configured to determine a distance of the calibration pattern relative to the sensor using at least one of the plurality of images of the calibration pattern, and to determine the calibration adjustment from the plurality of images of the calibration pattern, the symbol, and the determined distance.

In Example 13, the sensor calibrator of any one of Examples 1 to 12, in which the sensor moves along the path of travel and the calibration pattern is stationary.

In Example 14, the sensor calibrator of Example 13, in which the one or more processors are located in a vehicle.

In Example 15, the sensor calibrator of any one of Examples 1 to 14, in which the calibration pattern moves along the path of travel and the sensor is stationary.

In Example 16, the sensor calibrator of Example 15, in which the one or more processors are located in roadway infrastructure.

In Example 17, the sensor calibrator of any one of Examples 1 to 16, in which at least one of the plurality of images of the calibration pattern includes an authentication symbol, and in which the one or more processors are further configured to verify the calibration pattern using the authentication symbol.

In Example 18, the sensor calibrator of Example 17, in which the one or more processors are configured to send the calibration instruction only if the calibration pattern is verified using the authentication symbol.

In Example 19, the sensor calibrator of any one of Examples 1 to 18, in which the sensor data includes any one or more of image sensor data, LIDAR sensor data, or RADAR sensor data.

In Example 20, the sensor calibrator of any one of Examples 1 to 19, in which the calibration pattern is a two-dimensional pattern.

In Example 21, the sensor calibrator of any one of Examples 1 to 20, in which the calibration pattern is a three-dimensional object.

In Example 22, the sensor calibrator of any one of Examples 1 to 21, in which the calibration instruction includes instructions to cause the sensor to be adjusted by the calibration adjustment.

In Example 23, the sensor calibrator of any one of Examples 1 to 22, in which there plurality of images are time-variant images.

In Example 24, a method of sensor calibration including determining a calibration adjustment sensor data representing a plurality of images of a calibration pattern taken during a period of relative motion between a sensor and the calibration pattern; and generating a calibration instruction for calibration of the sensor according to the determined calibration adjustment.

In Example 25, the method of sensor calibration of Example 24, in which one or more of the plurality of images of the calibration pattern include a symbol representing one or more physical attributes of the calibration pattern, and further including determining the calibration adjustment from the plurality of images and the one or more physical attributes of the calibration pattern.

In Example 26, the method of sensor calibration of Example 25, in which the one or more physical attributes of the calibration pattern include a type of calibration pattern and/or one or more dimensions of the calibration pattern.

In Example 27, the method of sensor calibration of any one of Examples 24 to 26, further including determining a pose of the calibration pattern relative to the sensor using at least one of the plurality of images of the calibration pattern, and determining the calibration adjustment from the plurality of images of the calibration pattern and the determined pose.

In Example 28, the method of sensor calibration of any one of Examples 25 to 27, further including determining the pose of the calibration pattern relative to the sensor using at least one of the plurality of images of the calibration pattern and the symbol, and determining the calibration adjustment from the plurality of images of the calibration pattern and the determined pose.

In Example 29, the method of sensor calibration of Examples 27 or 28, in which determining the pose of the calibration pattern includes determining an angle of an intersection between a normalized plane of the calibration pattern and an optical axis of the sensor; and determining the calibration adjustment from the angle of intersection.

In Example 30, the method of sensor calibration of any one of Examples 27 to 29, in which determining the pose of the calibration pattern includes determining one or more of a yaw, a roll, or a pitch of the calibration pattern relative to the sensor.

In Example 31, the method of sensor calibration of any one of Examples 24 to 30, further including determining a distance of the calibration pattern relative to the sensor using at least one of the plurality of images of the calibration pattern, and determining the calibration adjustment from the plurality of images of the calibration pattern and the determined distance.

In Example 32, the method of sensor calibration of any one of Examples 24 to 31, in which the sensor moves along the path of travel and the calibration pattern is stationary.

In Example 33, the method of sensor calibration of any one of Examples 24 to 32, in which the calibration pattern moves along the path of travel and the sensor is stationary.

In Example 34, the method of sensor calibration of any one of Examples 24 to 33, in which at least one of the plurality of images of the calibration pattern includes an authentication symbol, and in which the one or more processors are further configured to verify the calibration pattern using the authentication symbol.

In Example 35, the method of sensor calibration of Example 34, further including sending the calibration instruction only if the calibration pattern is verified using the authentication symbol.

In Example 36, the method of sensor calibration of Example 34 or 35, in which the authentication symbol represents a type of the calibration pattern.

In Example 37, the method of sensor calibration of Example 36, further including determining the calibration adjustment by interpreting the plurality of images of the calibration pattern and the authentication symbol representing the type of calibration pattern.

In Example 38, the method of sensor calibration of any one of Examples 35 to 39, in which the authentication symbol represent a one or more dimensions of the calibration pattern.

In Example 41, the method of sensor calibration of any one of Examples 36 to 40, in which the authentication symbol includes any one of a two-dimensional bar code, a three-dimensional bar code, or a QR-Code.

In Example 42, the method of sensor calibration of any one of Examples 24 to 41, in which the sensor data includes any one or more of image sensor data, LIDAR sensor data, or RADAR sensor data.

In Example 43, the method of sensor calibration of any one of Examples 24 to 42, in which the calibration pattern is a two-dimensional pattern.

In Example 44, the method of sensor calibration of any one of Examples 24 to 43, in which the calibration pattern is a three-dimensional object.

In Example 45, the sensor calibrator of any one of Examples 24 to 44, in which the calibration instruction includes instructions to cause the sensor to be adjusted by the calibration adjustment.

In Example 46, the method of sensor calibration of any one of Examples 24 to 45, in which there plurality of images are time-variant images.

In Example 47, a non-transitory computer readable medium including instructions that, when executed, cause one or more processors to perform any method of Examples 24 to 44.

In Example 48, a sensor calibration system including one or more processors configured to: receive sensor data representing a calibration pattern detected by a sensor during a period of relative motion between the sensor and the calibration pattern in which the sensor or the calibration pattern move along a linear path of travel; determine a calibration adjustment from the plurality of images; and send a calibration instruction for calibration of the sensor according to the determined calibration adjustment; and a calibration element, including a calibration pattern.

In Example 49, the sensor calibration system of Example 48, in which the calibration pattern includes a symbol representing one or more physical attributes of the calibration pattern, and in which the one or more processors are configured to determine the calibration adjustment from the plurality of images and the symbol.

In Example 50, the sensor calibration system of Example 49, in which the symbol includes at least one of a two-dimensional bar code, a three-dimensional bar code, or a QR-Code.

In Example 51, the sensor calibration system of Example 49 or 50, in which the one or more physical attributes of the calibration pattern include any of a type of calibration pattern, and one or more dimensions of the calibration pattern.

In Example 52, the sensor calibration system of any one of Examples 49 to 50, in which the symbol further includes data representing a linear direction of a roadway in a vicinity of the calibration pattern.

In Example 53, the sensor calibration system of any one of Examples 46 to 52, in which the one or more processors are further configured to determine a pose of the calibration pattern relative to the sensor using at least one of the plurality of images of the calibration pattern, and to determine the calibration adjustment from at least one of the plurality of images of the calibration pattern and the determined pose.

In Example 54, the sensor calibration system of any one of Examples 46 to 53, in which the one or more processors are further configured to determine the pose of the calibration pattern relative to the sensor using at least one of the plurality of images of the calibration pattern and the symbol and to determine the calibration adjustment from the plurality of images of the calibration pattern and the determined pose.

In Example 55, the sensor calibration system of Example 53 or 54, in which determining the pose of the calibration pattern includes determining an angle of an intersection between a normalized plane of the calibration pattern and an optical axis of the sensor; and in which the one or more processors are further configured to determine the calibration adjustment from the angle of intersection.

In Example 56, the sensor calibration system Example 55, in which the symbol further represents a linear direction of a roadway and/or a linear path of travel, and in which the one or more processors are further configured to determine the calibration adjustment from the angle of intersection and the linear direction of the roadway or the linear path of travel.

In Example 57, the sensor calibration system Example 55, in which the one or more processors are further configured to determine the calibration adjustment from the angle of intersection and the linear path of travel.

In Example 58, the sensor calibration system of any one of Examples 53 to 57, in which determining the pose of the calibration pattern includes determining one or more of a yaw, a roll, or a pitch of the calibration pattern relative to the sensor.

In Example 59, the sensor calibration system of any one of Examples 46 to 58, in which the one or more processors are further configured to determine a distance of the calibration pattern relative to the sensor using at least one of the plurality of images of the calibration pattern, and to determine the calibration adjustment from the plurality of images of the calibration pattern, the symbol, and the determined distance.

In Example 60, the sensor calibration system of any one of Examples 46 to 59, in which the sensor moves along the path of travel and the calibration pattern is stationary.

In Example 61, the sensor calibration system of Example 60, in which the one or more processors are located in a vehicle.

In Example 62, the sensor calibration system of any one of Examples 46 to 61, in which the calibration pattern moves along the path of travel and the sensor is stationary.

In Example 63, the sensor calibration system of Example 62, in which the one or more processors are located in roadway infrastructure.

In Example 64, the sensor calibration system of any one of Examples 46 to 63, in which at least one of the plurality of images of the calibration pattern includes an authentication symbol, and in which the one or more processors are further configured to verify the calibration pattern using the authentication symbol.

In Example 65, the sensor calibration system of Example 64, in which the one or more processors are configured to send the calibration instruction only if the calibration pattern is verified using the authentication symbol.

In Example 66, the sensor calibration system of any one of Examples 46 to 65, in which the sensor data includes any one or more of image sensor data, LIDAR sensor data, or RADAR sensor data.

In Example 67, the sensor calibration system of any one of Examples 46 to 66, in which the calibration pattern is a two-dimensional pattern.

In Example 68, the sensor calibration system of any one of Examples 46 to 67, in which the calibration pattern is a three-dimensional object.

In Example 69, the sensor calibration system of any one of Examples 46 to 68, in which the calibration instruction includes instructions to cause the sensor to be adjusted by the calibration adjustment.

In Example 70, the sensor calibration system of any one of Examples 46 to 69, in which there plurality of images are time-variant images.

In Example 71, a sensor calibration detection device, including: one or more processors, configured to: determine a difference between first sensor data detected during movement of a first sensor along a route of travel and stored second sensor data; and if the difference is outside of a predetermined range, switch from a first operational mode to a second operational mode.

In Example 72, the sensor calibration detection device of Example 69, in which determining a difference between the first sensor data and stored second sensor data includes determining a mean of the second sensor data and determining a difference between the first sensor data and the mean of the second sensor data.

In Example 73, the sensor calibration detection device of Example 69, in which determining a difference between the first sensor data and stored second sensor data includes determining a mean of a subset of the second sensor data and determining a difference between the first sensor data and the mean of the subset.

In Example 74, the sensor calibration detection device of Example 69 to 73, in which the first operational mode includes incorporating the first sensor data in the second sensor data.

In Example 75, the sensor calibration detection device of Example 69 or 74, in which the second operational mode includes discarding the first sensor data.

In Example 76, the sensor calibration detection device of any one of Examples 69 to 75, in which the second operational mode includes sending a signal representing a determination that the difference is outside of the predetermined range.

In Example 77, the sensor calibration detection device of any one of Examples 69 to 76, in which the second operational mode includes controlling a transceiver to send a notification that the difference is outside of the predetermined range.

In Example 78, the sensor calibration detection device of any one of Examples 69 to 77, in which determining the difference between the first sensor data and the second sensor data includes comparing the first sensor data to sensor data of a plurality of second sensors.

In Example 79, the sensor calibration detection device of any one of Examples 69 to 78, in which the one or more processors are further configured to determine a mean and variance of the second sensor data, and in which determining the difference between the first sensor data and the second sensor data includes determining a difference between the first sensor data and the mean and the variance of the second sensor data.

In Example 80, the sensor calibration detection device of any one of Examples 69 to 79, in which the one or more processors are further configured to determine a Gaussian distribution of the second sensor data, and in which determining the difference between the first sensor data and the second sensor data includes determining a difference between the first sensor data and the Gaussian distribution of the second sensor data.

In Example 81, the sensor calibration detection device of any one of Examples 79 to 80, in which the second operational mode includes the one or more processors determining an sensor calibration instruction as a difference between first sensor data and the mean and variance or the Gaussian distribution of the second sensor data; further including the one or more processors sending the instruction.

In Example 82, the sensor calibration detection device of any one of Examples 69 to 81, in which the second operational mode includes the one or more processors determining an affine transformation of the first sensor data relative to a mean of the second sensor data, and sending an instruction to adjust a sensor corresponding to the first sensor data by the determined affine transformation.

In Example 83, the sensor calibration detection device of any one of Examples 69 to 82, in which the second operational mode includes the one or more processors determining an affine transformation of the first sensor data relative to a mean of a selection of the second sensor data, and sending an instruction to adjust a sensor corresponding to the first sensor data by the determined affine transformation.

In Example 84, the sensor calibration detection device of Example 69 or 83, in which the second sensor data is data that is detected during movement of one or more second sensors along the route of travel.

In Example 85, the sensor calibration detection device of Example 82 or 84, further including the one or more processors controlling a communication device to transmit the instruction.

In Example 86, a method of sensor calibration detection, including:
determining a difference between first sensor data detected during movement of a first sensor along a route of travel and stored second sensor data; and if the difference is outside of a predetermined range, switching from a first operational mode to a second operational mode.

In Example 87, the method of sensor calibration detection of Example 45, in which determining a difference between the first sensor data and stored second sensor data includes determining a mean of the second sensor data and determining a difference between the first sensor data and the mean of the second sensor data.

In Example 88, the method of sensor calibration detection of Example 45, in which determining a difference between the first sensor data and stored second sensor data includes determining a mean of a subset of the second sensor data and determining a difference between the first sensor data and the mean of the subset.

In Example 89, the method of sensor calibration detection of Example 45 to 88, in which the first operational mode includes incorporating the first sensor data in the second sensor data.

In Example 90, the method of sensor calibration detection of Example 45 or 89, in which the second operational mode includes discarding the first sensor data.

In Example 91, the method of sensor calibration detection of any one of Examples 45 to 90, in which the second operational mode includes sending a signal representing a determination that the difference is outside of the predetermined range.

In Example 92, the method of sensor calibration detection of any one of Examples 45 to 91, in which the second operational mode includes controlling a transceiver to send a notification that the difference is outside of the predetermined range.

In Example 93, the method of sensor calibration detection of any one of Examples 45 to 92, in which determining the difference between the first sensor data and the second sensor data includes comparing the first sensor data to sensor data of a plurality of second sensors.

In Example 94, the method of sensor calibration detection of any one of Examples 45 to 93, further including determining a mean and variance of the second sensor data, and in which determining the difference between the first sensor data and the second sensor data includes determining a difference between the first sensor data and the mean and the variance of the second sensor data.

In Example 95, the method of sensor calibration detection of any one of Examples 45 to 94, further including determining a Gaussian distribution of the second sensor data, and in which determining the difference between the first sensor data and the second sensor data includes determining a difference between the first sensor data and the Gaussian distribution of the second sensor data.

In Example 96, the method of sensor calibration detection of any one of Examples 94 to 95, in which the second operational mode includes the one or more processors determining an sensor calibration instruction as a difference between first sensor data and the mean and variance or the Gaussian distribution of the second sensor data; further including the one or more processors sending the instruction.

In Example 97, the method of sensor calibration detection of any one of Examples 45 to 96, in which the second operational mode includes the one or more processors determining an affine transformation of the first sensor data relative to a mean of the second sensor data, and sending an instruction to adjust a sensor corresponding to the first sensor data by the determined affine transformation.

In Example 98, the method of sensor calibration detection of any one of Examples 45 to 97, in which the second operational mode includes the one or more processors determining an affine transformation of the first sensor data relative to a mean of a selection of the second sensor data, and sending an instruction to adjust a sensor corresponding to the first sensor data by the determined affine transformation.

In Example 99, the method of sensor calibration detection of Example 45 or 98, in which the second sensor data is data that is detected during movement of one or more second sensors along the route of travel.

In Example 100, the method of sensor calibration detection of Example 97 or 99, further including the one or more processors controlling a communication device to transmit the instruction.

In Example 101, a non-transitory computer readable medium including instructions that, when executed, cause one or more processors to perform any method of Examples 84 to 100.

In Example 102, a sensor calibrating means including one or more processing means configured to: receive sensor data representing a calibration pattern detected by a sensor during a period of relative motion between the sensor and the calibration pattern in which the sensor or the calibration pattern move along a linear path of travel; determine a calibration adjustment from the plurality of images; and send a calibration instruction for calibration of the sensor according to the determined calibration adjustment.

In Example 103, a sensor calibration detection means, including: one or more processors, configured to: receive first sensor data detected during movement of a first sensor along a route of travel; determine a difference between the first sensor data and stored second sensor data; and if the difference is outside of a predetermined range, switch from a first operational mode to a second operational mode.

In Example 104, a vehicle, including, a sensor calibrator, the sensor calibrator including one or more processors configured to: determine a calibration adjustment from sensor data representing a plurality of images of a calibration pattern detected by a sensor for a period of relative motion between the sensor and the calibration pattern in which the sensor moves along a linear path of travel; and generate a calibration instruction for calibration of the sensor according to the determined calibration adjustment.

In Example 105, the vehicle of Example 104, in which one or more of the plurality of images of the calibration pattern include a symbol representing one or more physical attributes of the calibration pattern, and in which the one or more processors are configured to determine the calibration adjustment from the plurality of images and the one or more physical attributes of the calibration pattern.

In Example 106, the vehicle of Example 105, in which the symbol includes at least one of a two-dimensional bar code, a three-dimensional bar code, or a QR-Code.

In Example 107, the vehicle of Example 105 or 106, in which the one or more physical attributes of the calibration pattern include any of a type of calibration pattern, and one or more dimensions of the calibration pattern.

In Example 108, the vehicle of any one of Examples 104 to 106, in which the symbol further includes data representing a linear direction of a roadway in a vicinity of the calibration pattern.

In Example 109, the vehicle of any one of Examples 104 to 108, in which the one or more processors are further configured to determine a pose of the calibration pattern relative to the sensor using at least one of the plurality of images of the calibration pattern, and to determine the calibration adjustment from at least one of the plurality of images of the calibration pattern and the determined pose.

In Example 110, the vehicle of any one of Examples 105 to 109, in which the one or more processors are further configured to determine the pose of the calibration pattern relative to the sensor using at least one of the plurality of images of the calibration pattern and the symbol and to determine the calibration adjustment from the plurality of images of the calibration pattern and the determined pose.

In Example 111, the vehicle of Example 109 or 110, in which determining the pose of the calibration pattern includes determining an angle of an intersection between a normalized plane of the calibration pattern and an optical axis of the sensor; and in which the one or more processors are further configured to determine the calibration adjustment from the angle of intersection.

In Example 112, the vehicle Example 111, in which the symbol further represents a linear direction of a roadway and/or a linear path of travel, and in which the one or more processors are further configured to determine the calibration adjustment from the angle of intersection and the linear direction of the roadway or the linear path of travel.

In Example 113, the vehicle Example 111, in which the one or more processors are further configured to determine the calibration adjustment from the angle of intersection and the linear path of travel.

In Example 114, the vehicle of any one of Examples 109 to 113, in which determining the pose of the calibration pattern includes determining one or more of a yaw, a roll, or a pitch of the calibration pattern relative to the sensor.

In Example 115, the vehicle of any one of Examples 104 to 114, in which the one or more processors are further configured to determine a distance of the calibration pattern relative to the sensor using at least one of the plurality of images of the calibration pattern, and to determine the calibration adjustment from the plurality of images of the calibration pattern, the symbol, and the determined distance.

In Example 116, the vehicle of any one of Examples 104 to 115, in which the sensor moves along the path of travel and the calibration pattern is stationary.

In Example 117, the vehicle of any one of Examples 104 to 116, in which at least one of the plurality of images of the calibration pattern includes an authentication symbol, and in which the one or more processors are further configured to verify the calibration pattern using the authentication symbol.

In Example 118, the vehicle of Example 117, in which the one or more processors are configured to send the calibration instruction only if the calibration pattern is verified using the authentication symbol.

In Example 119, the vehicle of any one of Examples 104 to 118, in which the sensor data includes any one or more of image sensor data, LIDAR sensor data, or RADAR sensor data.

In Example 120, the vehicle of any one of Examples 104 to 119, in which the calibration pattern is a two-dimensional pattern.

In Example 121, the vehicle of any one of Examples 104 to 120, in which the calibration pattern is a three-dimensional object.

In Example 122, the vehicle of any one of Examples 104 to 121, in which the calibration instruction includes instructions to cause the sensor to be adjusted by the calibration adjustment.

In Example 123, the vehicle of any one of Examples 104 to 122, in which there plurality of images are time-variant images.

In Example 124, a roadside unit, including a sensor calibrator, the sensor calibrator including one or more processors configured to: determine a calibration adjustment from sensor data representing a plurality of images of a calibration pattern detected by a sensor for a period of relative motion between the sensor and the calibration pattern in which the calibration pattern moves along a linear path of travel; and generate a calibration instruction for calibration of the sensor according to the determined calibration adjustment.

In Example 125, the roadside unit of Example 124, in which one or more of the plurality of images of the calibration pattern include a symbol representing one or more physical attributes of the calibration pattern, and in which the one or more processors are configured to determine the calibration adjustment from the plurality of images and the one or more physical attributes of the calibration pattern.

In Example 126, the roadside unit of Example 125, in which the symbol includes at least one of a two-dimensional bar code, a three-dimensional bar code, or a QR-Code.

In Example 127, the roadside unit of Example 125 or 126, in which the one or more physical attributes of the calibration pattern include any of a type of calibration pattern, and one or more dimensions of the calibration pattern.

In Example 128, the roadside unit of any one of Examples 124 to 126, in which the symbol further includes data representing a linear direction of a roadway in a vicinity of the calibration pattern.

In Example 129, the roadside unit of any one of Examples 124 to 128, in which the one or more processors are further configured to determine a pose of the calibration pattern relative to the sensor using at least one of the plurality of images of the calibration pattern, and to determine the calibration adjustment from at least one of the plurality of images of the calibration pattern and the determined pose.

In Example 130, the roadside unit of any one of Examples 125 to 129, in which the one or more processors are further configured to determine the pose of the calibration pattern relative to the sensor using at least one of the plurality of images of the calibration pattern and the symbol and to determine the calibration adjustment from the plurality of images of the calibration pattern and the determined pose.

In Example 131, the roadside unit of Example 129 or 130, in which determining the pose of the calibration pattern includes determining an angle of an intersection between a normalized plane of the calibration pattern and an optical axis of the sensor; and in which the one or more processors are further configured to determine the calibration adjustment from the angle of intersection.

In Example 132, the roadside unit of Example 131, in which the symbol further represents a linear direction of a roadway and/or a linear path of travel, and in which the one or more processors are further configured to determine the calibration adjustment from the angle of intersection and the linear direction of the roadway or the linear path of travel.

In Example 133, the roadside unit of Example 131, in which the one or more processors are further configured to determine the calibration adjustment from the angle of intersection and the linear path of travel.

In Example 134, the roadside unit of any one of Examples 129 to 133, in which determining the pose of the calibration pattern includes determining one or more of a yaw, a roll, or a pitch of the calibration pattern relative to the sensor.

In Example 135, the roadside unit of any one of Examples 124 to 134, in which the one or more processors are further configured to determine a distance of the calibration pattern relative to the sensor using at least one of the plurality of images of the calibration pattern, and to determine the calibration adjustment from the plurality of images of the calibration pattern, the symbol, and the determined distance.

In Example 136, the roadside unit of any one of Examples 124 to 135, in which the calibration pattern moves along the path of travel and the sensor is stationary.

In Example 137, the roadside unit of any one of Examples 124 to 136, in which at least one of the plurality of images of the calibration pattern includes an authentication symbol, and in which the one or more processors are further configured to verify the calibration pattern using the authentication symbol.

In Example 138, the roadside unit of Example 137, in which the one or more processors are configured to send the calibration instruction only if the calibration pattern is verified using the authentication symbol.

In Example 139, the roadside unit of any one of Examples 124 to 138, in which the sensor data includes any one or more of image sensor data, LIDAR sensor data, or RADAR sensor data.

In Example 140, the roadside unit of any one of Examples 124 to 139, in which the calibration pattern is a two-dimensional pattern.

In Example 141, the roadside unit of any one of Examples 1 to 140, in which the calibration pattern is a three-dimensional object.

In Example 142, the roadside unit of any one of Examples 124 to 141, in which the calibration instruction includes instructions to cause the sensor to be adjusted by the calibration adjustment.

In Example 143, the roadside unit of any one of Examples 124 to 142, in which there plurality of images are time-variant images.

In Example 144, a means for sensor calibration is disclosed, including a determining means for determination of a calibration adjustment sensor data representing a plurality of images of a calibration pattern taken during a period of relative motion between a sensor and the calibration pattern; and generating means for generation of a calibration instruction for calibration of the sensor according to the determined calibration adjustment.

In Example 145, a means for sensor calibration detection is disclosed including a determining means for determining a difference between first sensor data detected during movement of a first sensor along a route of travel and stored second sensor data; and an operational mode switching means, for, if the difference is outside of a predetermined range, switching the one or more processors from operating in a first operational mode to operating in a second operational mode.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A sensor calibrator comprising one or more processors configured to:
   determine a calibration adjustment from sensor data representing a plurality of images of a calibration pattern detected by a sensor for a period of relative motion between the sensor and the calibration pattern in which the sensor or the calibration pattern move along a linear path of travel; and
   generate a calibration instruction for calibration of the sensor based on the determined calibration adjustment;
   wherein one or more of the plurality of images of the calibration pattern further comprise a symbol, in which is encoded a value representing a pose of the calibration pattern relative to the image sensor, and wherein the one or more processors are configured to determine the calibration adjustment from the plurality of images and the value.

2. The sensor calibrator of claim 1, wherein the symbol includes at least one of a two-dimensional bar code, a three-dimensional bar code, or a Quick-Response-Code.

3. The sensor calibrator of claim 1, wherein further encoded in the symbol is a value representing a linear direction of a roadway in a vicinity of the calibration pattern, and wherein the one or more processors are further configured to determine the calibration adjustment from the value representing the linear direction of the roadway.

4. The sensor calibrator of claim 1, wherein the one or more processors are further configured to determine a pose of the calibration pattern relative to the sensor using at least one of the plurality of images of the calibration pattern, and to determine the calibration adjustment from at least one of the plurality of images of the calibration pattern and the determined pose.

5. The sensor calibrator of claim 1, wherein the one or more processors are further configured to determine the pose of the calibration pattern relative to the sensor using at least one of the plurality of images of the calibration pattern and the symbol and to determine the calibration adjustment from the plurality of images of the calibration pattern and the determined pose.

6. The sensor calibrator of claim 5, wherein determining the pose of the calibration pattern comprises determining an angle of an intersection between a normalized plane of the calibration pattern and an optical axis of the sensor; and wherein the one or more processors are further configured to determine the calibration adjustment from the angle of intersection.

7. The sensor calibrator of claim 1, wherein the sensor moves along the path of travel and the calibration pattern is stationary.

8. The sensor calibrator of claim 1, wherein the calibration pattern moves along the path of travel and the sensor is stationary.

9. One or more non-transitory computer readable media, comprising instructions which, if executed, cause one or more processors to:
determine a calibration adjustment sensor data representing a plurality of images of a calibration pattern taken during a period of relative motion between a sensor and the calibration pattern; and
generate a calibration instruction for calibration of the sensor according to the determined calibration adjustment;
wherein one or more of the plurality of images of the calibration pattern further comprise a symbol, in which is encoded a value representing a pose of the calibration pattern relative to the image sensor, and wherein the one or more processors are configured to determine the calibration adjustment from the plurality of images and the value.

10. A sensor calibration detection device, comprising:
one or more processors, configured to:
obtain first sensor data and an authentication symbol from a first sensor detected during movement of the first sensor along a route of travel;
verify the authenticity of the first sensor data using the authentication symbol;
determine a difference between the first sensor data and stored second sensor data; and
if the difference is outside of a predetermined range, switch the one or more processors from operating in a first operational mode to operating in a second operational mode.

11. The sensor calibration detection device of claim 10, wherein determining a difference between the first sensor data and the second sensor data comprises determining a mean of the second sensor data and determining a difference between the first sensor data and the mean of the second sensor data.

12. The sensor calibration detection device of claim 10, wherein the first operational mode comprises incorporating the first sensor data in the second sensor data.

13. The sensor calibration detection device of claim 10, wherein the second operational mode comprises sending a signal representing a determination that the difference is outside of the predetermined range.

14. The sensor calibration detection device of claim 10, wherein the one or more processors are further configured to determine a mean and variance of the second sensor data, and wherein determining the difference between the first sensor data and the second sensor data comprises determining a difference between the first sensor data and the mean and the variance of the second sensor data.

15. The sensor calibration detection device of claim 14, wherein the second operational mode comprises the one or more processors determining an sensor calibration instruction as a difference between first sensor data and the mean and variance of the second sensor data; further comprising the one or more processors sending the instruction.

16. The sensor calibration detection device of claim 14, wherein the second operational mode comprises the one or more processors determining an affine transformation of the first sensor data relative to a mean of the second sensor data, and sending an instruction to adjust a sensor corresponding to the first sensor data by the determined affine transformation.

17. The sensor calibration detection device of claim 10, wherein the second sensor data is data that is detected for movement of one or more second sensors along the route of travel.

18. One or more non-transitory computer readable media, comprising instructions which, when executed, cause one or more processors to:
obtain first sensor data and an authentication symbol from a first sensor detected during movement of the first sensor along a route of travel;
verify the authenticity of the first sensor data using the authentication symbol;
determine a difference between the first sensor data and stored second sensor data; and
if the difference is outside of a predetermined range, switch the one or more processors from operating in a first operational mode to operating in a second operational mode.

19. The one or more non-transitory computer readable media of claim 18, further comprising determining a mean and variance of the second sensor data, and wherein determining the difference between the first sensor data and the second sensor data comprises determining a difference between the first sensor data and the mean and the variance of the second sensor data.

20. A vehicle, comprising:
a sensor calibrator, the sensor calibrator comprising:
one or more processors configured to determine a calibration adjustment from sensor data representing a plurality of images of a calibration pattern detected by a sensor for a period of relative motion between the sensor and the calibration pattern in which the sensor moves along a linear path of travel; and
to generate a calibration instruction for calibration of the sensor according to the determined calibration adjustment;
wherein one or more of the plurality of images of the calibration pattern further comprise a symbol, in which is encoded a value representing a pose of the calibration pattern relative to the image sensor, and wherein the one or more processors are configured to determine the calibration adjustment from the plurality of images and the value.

21. A roadside unit, comprising:

a sensor calibrator, the sensor calibrator comprising:

one or more processors configured to determine a calibration adjustment from sensor data representing a plurality of images of a calibration pattern detected by a sensor for a period of relative motion between the sensor and the calibration pattern in which the calibration pattern moves along a linear path of travel; and to generate a calibration instruction for calibration of the sensor according to the determined calibration adjustment;

wherein one or more of the plurality of images of the calibration pattern further comprise a symbol, in which is encoded a value representing a pose of the calibration pattern relative to the image sensor, and wherein the one or more processors are configured to determine the calibration adjustment from the plurality of images and the value.

22. The sensor calibrator of claim 1, wherein at least one of the plurality of images of the calibration pattern includes an authentication symbol, and wherein the one or more processors are further configured to verify the calibration pattern using the authentication symbol.

23. The sensor calibrator of claim 9, wherein at least one of the plurality of images of the calibration pattern includes an authentication symbol, and wherein the one or more processors are further configured to verify the calibration pattern using the authentication symbol.

24. The sensor calibrator of claim 20, wherein at least one of the plurality of images of the calibration pattern includes an authentication symbol, and wherein the one or more processors are further configured to verify the calibration pattern using the authentication symbol.

\* \* \* \* \*